US010924818B2

(12) United States Patent
Trollope et al.

(10) Patent No.: US 10,924,818 B2
(45) Date of Patent: *Feb. 16, 2021

(54) METHODS, SYSTEMS, AND MEDIA FOR PRESENTING SUPPLEMENTAL CONTENT RELATING TO MEDIA CONTENT BASED ON STATE INFORMATION THAT INDICATES A SUBSEQUENT VISIT TO THE CONTENT INTERFACE

(71) Applicant: Google LLC, Mountain View, CA (US)

(72) Inventors: Ingrid McAulay Trollope, Richmond (GB); Ant Oztaskent, Greenwich (GB); Yaroslav Volovich, Cambridge (GB)

(73) Assignee: Google LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/911,502

(22) Filed: Mar. 5, 2018

(65) Prior Publication Data

US 2018/0206007 A1 Jul. 19, 2018

Related U.S. Application Data

(63) Continuation of application No. 15/345,342, filed on Nov. 7, 2016, now Pat. No. 9,913,000, which is a (Continued)

(51) Int. Cl.
*H04N 21/8358* (2011.01)
*G06T 1/00* (2006.01)
(Continued)

(52) U.S. Cl.
CPC ....... *H04N 21/8358* (2013.01); *G06T 1/0021* (2013.01); *G10L 19/018* (2013.01); (Continued)

(58) Field of Classification Search
CPC ......... H04N 21/8358; H04N 21/42203; H04N 21/8126; H04N 21/436; H04N 21/41407; (Continued)

(56) References Cited

U.S. PATENT DOCUMENTS 7,028,327 B1 4/2006 Dougherty et al.
7,631,192 B1 12/2009 Matsuo
(Continued)

FOREIGN PATENT DOCUMENTS

CN 1735162 2/2006
CN 101883230 11/2010
(Continued)

OTHER PUBLICATIONS

Digital Living Network Alliance, "DLNA Guidelines Part 1: Architecture and Protocols", Technical Report, Dec. 2011.
(Continued)

*Primary Examiner* — Yassin Alata
(74) *Attorney, Agent, or Firm* — Byrne Poh LLP

(57) ABSTRACT

In accordance with some implementations of the disclosed subject matter, mechanisms for presenting recommended media content items are provided. In some implementations, a method for providing media guidance is provided, the method comprising: receiving a request for supplemental content relating to a program being presented by a media device; causing a content interface to be presented on a mobile device; identifying the program that is being presented on a media device; determining keywords associated with the program, wherein each of the keywords is associated with a particular portion of the program; obtaining and storing supplemental content items corresponding to the program based on the keywords; causing the content interface to present a first supplemental content item; receiving state information associated with the mobile device that
(Continued)

indicates a subsequent visit to the content interface; and causing the content interface to present a second supplemental content item based on the state information.

21 Claims, 11 Drawing Sheets

Related U.S. Application Data continuation of application No. 14/190,999, filed on Feb. 26, 2014, now Pat. No. 9,491,522.

(60) Provisional application No. 61/922,212, filed on Dec. 31, 2013.

(51) Int. Cl.
| | | |
|---|---|---|
| *H04N 1/32* | (2006.01) | |
| *H04N 19/467* | (2014.01) | |
| *H04N 21/233* | (2011.01) | |
| *H04N 21/414* | (2011.01) | |
| *H04N 1/327* | (2006.01) | |
| *H04N 21/41* | (2011.01) | |
| *H04N 21/422* | (2011.01) | |
| *H04N 21/8405* | (2011.01) | |
| *G10L 19/018* | (2013.01) | |
| *H04N 21/436* | (2011.01) | |
| *H04N 21/81* | (2011.01) | |
| *H04N 21/435* | (2011.01) | |
| *H04N 21/439* | (2011.01) | |
| *H04N 21/475* | (2011.01) | |

(52) U.S. Cl.
CPC ..... *H04N 1/32144* (2013.01); *H04N 1/32776* (2013.01); *H04N 1/32782* (2013.01); *H04N 1/32784* (2013.01); *H04N 19/467* (2014.11); *H04N 21/233* (2013.01); *H04N 21/4126* (2013.01); *H04N 21/41407* (2013.01); *H04N 21/42203* (2013.01); *H04N 21/436* (2013.01); *H04N 21/8126* (2013.01); *H04N 21/8405* (2013.01); *H04N 21/435* (2013.01); *H04N 21/4394* (2013.01); *H04N 21/4755* (2013.01); *H04N 21/812* (2013.01)

(58) Field of Classification Search
CPC ............. H04N 21/233; H04N 21/4755; H04N 21/812; H04N 21/4394; H04N 21/435; H04N 1/32782; H04N 1/32784; H04N 1/32776; H04N 1/32144; G10L 19/018; G10L 19/467; G06T 1/0021
See application file for complete search history.

(56) References Cited

U.S. PATENT DOCUMENTS

| | | | |
|---|---|---|---|
| 7,840,980 B2 | 11/2010 | Gutta | |
| 8,185,543 B1 | 5/2012 | Choudhry et al. | |
| 8,205,223 B2 | 6/2012 | Pack et al. | |
| 8,320,819 B2 | 11/2012 | Räbinä et al. | |
| 8,392,951 B2 | 3/2013 | Park et al. | |
| 8,528,036 B2* | 9/2013 | Davis | H04M 1/72533 |
| | | | 725/118 |
| 8,694,533 B2 | 4/2014 | Oztaskent et al. | |
| 8,929,657 B2 | 1/2015 | Jung | |
| 2002/0147984 A1 | 10/2002 | Tomsen et al. | |
| 2005/0114882 A1 | 5/2005 | Sakamaki et al. | |
| 2005/0149988 A1 | 7/2005 | Grannan | |
| 2007/0124756 A1 | 5/2007 | Covell et al. | |
| 2007/0150462 A1 | 6/2007 | Nonaka et al. | |
| 2007/0183355 A1* | 8/2007 | Kuchibhotla | H04W 52/0238 |
| | | | 370/318 |
| 2008/0098432 A1 | 4/2008 | Hardacker et al. | |
| 2008/0134328 A1 | 6/2008 | Yang et al. | |
| 2008/0163325 A1 | 7/2008 | Yamamoto et al. | |
| 2008/0226119 A1 | 9/2008 | Candelore et al. | |
| 2008/0229363 A1 | 9/2008 | Lanfermann et al. | |
| 2009/0276805 A1 | 11/2009 | Andrews et al. | |
| 2010/0031293 A1 | 2/2010 | Ohde et al. | |
| 2010/0082585 A1 | 4/2010 | Barsook et al. | |
| 2011/0022633 A1 | 1/2011 | Bernosky et al. | |
| 2011/0043652 A1 | 2/2011 | King et al. | |
| 2011/0102444 A1 | 5/2011 | Matsumoto | |
| 2011/0103763 A1 | 5/2011 | Tse et al. | |
| 2011/0125735 A1 | 5/2011 | Petrou | |
| 2011/0258211 A1 | 10/2011 | Kalisky et al. | |
| 2011/0282906 A1 | 11/2011 | Wong | |
| 2011/0289098 A1 | 11/2011 | Oztaskent et al. | |
| 2012/0008821 A1 | 1/2012 | Sharon et al. | |
| 2012/0096499 A1 | 4/2012 | Dasher et al. | |
| 2012/0117057 A1 | 5/2012 | Adimatyam et al. | |
| 2012/0167144 A1* | 6/2012 | Avison-Fell | H04N 21/8586 |
| | | | 725/51 |
| 2012/0227074 A1 | 9/2012 | Hill et al. | |
| 2012/0240144 A1 | 9/2012 | Rose | |
| 2012/0311623 A1 | 12/2012 | Davis et al. | |
| 2012/0311641 A1 | 12/2012 | Allard | |
| 2013/0036442 A1 | 2/2013 | Wingert | |
| 2013/0047178 A1 | 2/2013 | Moon et al. | |
| 2013/0104172 A1 | 4/2013 | Lee et al. | |
| 2013/0111514 A1* | 5/2013 | Slavin | H04H 60/64 |
| | | | 725/18 |
| 2013/0151728 A1* | 6/2013 | Currier | H04N 21/242 |
| | | | 709/248 |
| 2013/0179436 A1 | 7/2013 | Yun et al. | |
| 2014/0013350 A1* | 1/2014 | Pan | H04N 21/41407 |
| | | | 725/32 |
| 2014/0089423 A1 | 3/2014 | Jackels | |
| 2014/0253472 A1 | 9/2014 | Ayoub et al. | |
| 2014/0255003 A1 | 9/2014 | Abramson | |
| 2014/0282677 A1* | 9/2014 | Mantell | H04N 21/4722 |
| | | | 725/23 |
| 2015/0193433 A1 | 7/2015 | Dykeman et al. | |
| 2017/0147095 A1 | 5/2017 | Nicholls et al. | |

FOREIGN PATENT DOCUMENTS

| | | |
|---|---|---|
| CN | 101981574 | 2/2011 |
| CN | 102833617 | 12/2012 |
| CN | 102868934 | 1/2013 |
| EP | 2388721 | 11/2011 |
| JP | 2006270869 | 10/2006 |
| JP | 2010154415 | 7/2010 |
| JP | 2011243204 | 12/2011 |
| JP | 2013016030 | 1/2013 |
| KR | 20060077988 | 7/2006 |
| KR | 20110125917 | 11/2011 |
| WO | WO/2012/014130 | 2/2012 |
| WO | WO 2012/139240 | 10/2012 |
| WO | WO/2012/166739 | 12/2012 |
| WO | WO/2013/040533 | 3/2013 |

OTHER PUBLICATIONS

International Preliminary Report on Patentability dated Sep. 24, 2015 in International Patent Application No. PCT/US2014/024255.
International Search Report and Written Opinion of the International Search Authority dated Jul. 28, 2014 in International Patent Application No. PCT/US2014/024255.
Notice of Allowance dated Apr. 17, 2015 in U.S. Appl. No. 13/827,413.
Notice of Allowance dated Jun. 5, 2015 in U.S. Appl. No. 13/826,910.
Notice of Allowance dated Oct. 27, 2017 in U.S. Appl. No. 15/345,342.
Notice of Allowance dated Nov. 9, 2016 in U.S. Appl. No. 15/005,470.
Office Action dated Jan. 23, 2018 in U.S. Appl. No. 15/431,431.
Office Action dated Jan. 30, 2015 in U.S. Appl. No. 13/826,910.
Office Action dated Feb. 1, 2016 in U.S. Appl. No. 14/190,999.

(56) References Cited

OTHER PUBLICATIONS

Office Action dated Mar. 25, 2015 in U.S. Appl. No. 13/834,394.
Office Action dated Apr. 13, 2017 in EP Patent Application No. 14725797.6.
Office Action dated May 5, 2017 in U.S. Appl. No. 15/345,342.
Office Action dated May 18, 2016 in U.S. Appl. No. 13/826,910.
Office Action dated Jun. 29, 2017 in U.S. Appl. No. 15/431,431.
Office Action dated Jul. 27, 2016 in U.S. Appl. No. 15/005,470.
Office Action dated Jul. 29, 2014 in U.S. Appl. No. 13/826,910.
Office Action dated Sep. 27, 2017 in U.S. Appl. No. 15/431,431.
Office Action dated Dec. 9, 2014 in U.S. Appl. No. 13/827,413.
U.S. Appl. No. 14/190,999, filed Feb. 26, 2014.
U.S. Appl. No. 13/594,693, filed Aug. 24, 2012.
U.S. Appl. No. 61/922,212, filed Dec. 31, 2013.
Universal Plug N Play Forum, "UPnP Device Architecture Version 1.1", Technical Report, Oct. 15, 2008.
YouTube, "Pharos Demonstration—Audiovisual Tunable Search—Part C", last updated Jan. 16, 2010, pp. 1, available at: https://www.youtube.com/watch?v=ZpxyNi6Ht50.
Notice of Allowance dated Jul. 5, 2016 in U.S. Appl. No. 14/190,999.
Office Action dated Mar. 13, 2018 in JP Patent Application No. 2016-501451.
Office Action dated Apr. 17, 2018 in CN Patent Application No. 201480021167.4.
Office Action dated Jul. 5, 2018 in U.S. Appl. No. 15/431,431.
Decision to Refuse a European Patent Application dated Nov. 15, 2018 in EP Patent Application No. 14725797.6.
Office Action dated Dec. 21, 2018 in CA Patent Application No. 2,908,549.
Summons to Attend Oral Proceedings dated Feb. 2, 2018 in EP Patent Application No. 14725797.6.
Office Action dated Jul. 25, 2019 in CN Patent Application No. 201480021167.4.
Office Action dated Dec. 16, 2019 in CA Patent Application No. 2,908,549.
Examination Report dated Mar. 16, 2020 in in Patent Application No. 3412/KOLNP/2015.
Notice of Allowance dated Mar. 25, 2020 in KR Patent Application No. 10-2015-7028591.
Office Action dated Apr. 23, 2020 in CN Patent Application No. 201480021167.4.

\* cited by examiner

METHODS, SYSTEMS, AND MEDIA FOR PRESENTING SUPPLEMENTAL CONTENT RELATING TO MEDIA CONTENT BASED ON STATE INFORMATION THAT INDICATES A SUBSEQUENT VISIT TO THE CONTENT INTERFACE

CROSS-REFERENCE TO RELATED APPLICATION

This application is a continuation of U.S. patent application Ser. No. 15/345,342, filed Nov. 7, 2016, which is a continuation of U.S. patent application Ser. No. 14/190,999, filed Feb. 26, 2014, which claims the benefit of U.S. Provisional Patent Application No. 61/922,212, filed Dec. 31, 2013, each of which is hereby incorporated by reference herein in its entirety.

TECHNICAL FIELD

The disclosed subject matter relates to methods, systems, and media for presenting supplemental content relating to media content.

BACKGROUND

While watching a program, a viewer is often interested in information relating to the program. For example, the viewer may want to search for additional information about a topic that is discussed in the program.

Search engines allow the viewer to search on the Internet for resources, which include webpages, images, video content, and audio content. A typical search engine provides a web page for entering search terms, where the search terms are inputted by the viewer. Search results conducted for particular search terms are provided to the viewer. Moreover, with the advent of mobile devices, the use of mobile search engines has increased. For example, using a mobile device, the viewer may perform a search and browse through Internet content while watching the program.

Text-based search engines, however, may be somewhat limited for this user. In an example where the user wants to find an article similar to that which is being discussed during a program, the user may attempt to obtain this information by entering one or more keywords into a search engine. The user then scans through search results to find a webpage containing information relating to the topic of the discussion. This can be a time consuming procedure for the user. Moreover, this can cause the user to miss a substantial portion of the program or cause the user to pause the program to obtain such information via this procedure.

Accordingly, mechanisms for presenting supplemental information relating to media content are provided.

SUMMARY

In accordance with some implementations of the disclosed subject matter, mechanisms for presenting supplemental content relating to media content are provided.

In accordance with some implementations of the disclosed subject matter, a method for providing media guidance is provided, the method comprising: receiving, using a hardware processor, a request for supplemental content relating to a program being presented by a media device, wherein the request includes media information generated by the media device presenting the program; causing a content interface to be presented on a mobile device in response to receiving the first request; identifying the program that is being presented on a media device based on the media information; determining a plurality of keywords associated with the program, wherein each of the keywords is associated with a particular portion of the program; obtaining and storing a plurality of supplemental content items corresponding to the program based on the plurality of keywords; causing the content interface to present a first supplemental content item from the plurality of supplemental content items, wherein the first supplemental content item is selected based on the keywords associated with the particular portion of the program; receiving state information associated with the mobile device that indicates a subsequent visit to the content interface; and causing the content interface to present a second supplemental content item from the plurality of supplemental content items that relates to the program that was identified as being presented on the media device based on the state information, wherein the first supplemental content item is selected based on the keywords associated with the particular portion of the program.

In accordance with some implementations of the disclosed subject matter, a system for providing media guidance is provided. The system comprising a hardware processor that is configured to: receive a request for supplemental content relating to a program being presented by a media device, wherein the request includes media information generated by the media device presenting the program; cause a content interface to be presented on a mobile device in response to receiving the first request; identify the program that is being presented on a media device based on the media information; determine a plurality of keywords associated with the program, wherein each of the keywords is associated with a particular portion of the program; obtain and store a plurality of supplemental content items corresponding to the program based on the plurality of keywords; cause the content interface to present a first supplemental content item from the plurality of supplemental content items, wherein the first supplemental content item is selected based on the keywords associated with the particular portion of the program; receive state information associated with the mobile device that indicates a subsequent visit to the content interface; and cause the content interface to present a second supplemental content item from the plurality of supplemental content items that relates to the program that was identified as being presented on the media device based on the state information, wherein the first supplemental content item is selected based on the keywords associated with the particular portion of the program.

In accordance with some implementations of the disclosed subject matter, a non-transitory computer-readable medium containing computer-executable instructions that, when executed by a processor, cause the processor to perform a method for providing media guidance, is provided. The method comprising: receiving a request for supplemental content relating to a program being presented by a media device, wherein the request includes media information generated by the media device presenting the program; causing a content interface to be presented on a mobile device in response to receiving the first request; identifying the program that is being presented on a media device based on the media information; determining a plurality of keywords associated with the program, wherein each of the keywords is associated with a particular portion of the program; obtaining and storing a plurality of supplemental content items corresponding to the program based on the plurality of keywords; causing the content interface to present a first supplemental content item from the plurality of supplemental content items, wherein the first supplemental content item is selected based on the keywords associated with the particular portion of the program; receiving state information associated with the mobile device that indicates a subsequent visit to the content interface; and causing the content interface to present a second supplemental content item from the plurality of supplemental content items that relates to the program that was identified as being presented on the media device based on the state information, wherein the first supplemental content item is selected based on the keywords associated with the particular portion of the program.

In accordance with some implementations of the disclosed subject matter, a system for providing media guidance is provided. The system comprising: means for receiving a request for supplemental content relating to a program being presented by a media device, wherein the request includes media information generated by the media device presenting the program; means for causing a content interface to be presented on a mobile device in response to receiving the first request; means for identifying the program that is being presented on a media device based on the media information; means for determining a plurality of keywords associated with the program, wherein each of the keywords is associated with a particular portion of the program; means for obtaining and means for storing a plurality of supplemental content items corresponding to the program based on the plurality of keywords; means for causing the content interface to present a first supplemental content item from the plurality of supplemental content items, wherein the first supplemental content item is selected based on the keywords associated with the particular portion of the program; means for receiving state information associated with the mobile device that indicates a subsequent visit to the content interface; and means for causing the content interface to present a second supplemental content item from the plurality of supplemental content items that relates to the program that was identified as being presented on the media device based on the state information, wherein the first supplemental content item is selected based on the keywords associated with the particular portion of the program.

In some implementations, the system further comprises means for causing the content interface to be presented in response to detecting the presence of the media device on a local area network, wherein the media device and the mobile device are connected to the local area network.

In some implementations, the system further comprises means for receiving an audio fingerprint of audio information corresponding to the program being presented on the media device, wherein the program is identified based on the audio fingerprint.

In some implementations, the system further comprises: means for extracting an audio stream from a plurality of programs; means for generating, for each of the plurality of programs, at least one audio fingerprint from at least a portion of the extracted audio stream that corresponds to one of the plurality of programs; means for storing the at least one audio fingerprint in a data source indexed by program; means for comparing the audio fingerprint with the at least one stored audio fingerprint; and means for identifying the program that is being presented on the media device based on the comparison.

In some implementations, the system further comprises means for storing the plurality of supplemental content items, the media information, and the plurality of keywords in a data source indexed by program and time within the program; means for selecting the first supplemental content item from the data source based on a first time determined from the request; and means for selecting the second supplemental content item from the data source based on a second time determined from the state information.

In some implementations, the system further comprises means for receiving an indication that the mobile device returned from a display inhibited state in which presentation of the content interface was inhibited.

In some implementations, the system further comprises means for receiving an indication that the mobile device has launched a recommendation application that provides the content interface.

In some implementations, the system further comprises means for causing the second supplemental content item to be presented in response to determining that the state information was received prior to the end of the program and in response to determining that the state information was received within a predetermined time from the presentation of the content interface.

BRIEF DESCRIPTION OF THE DRAWINGS

Various objects, features, and advantages of the disclosed subject matter can be more fully appreciated with reference to the following detailed description of the disclosed subject matter when considered in connection with the following drawings, in which like reference numerals identify like elements.

DETAILED DESCRIPTION

Figure 1:
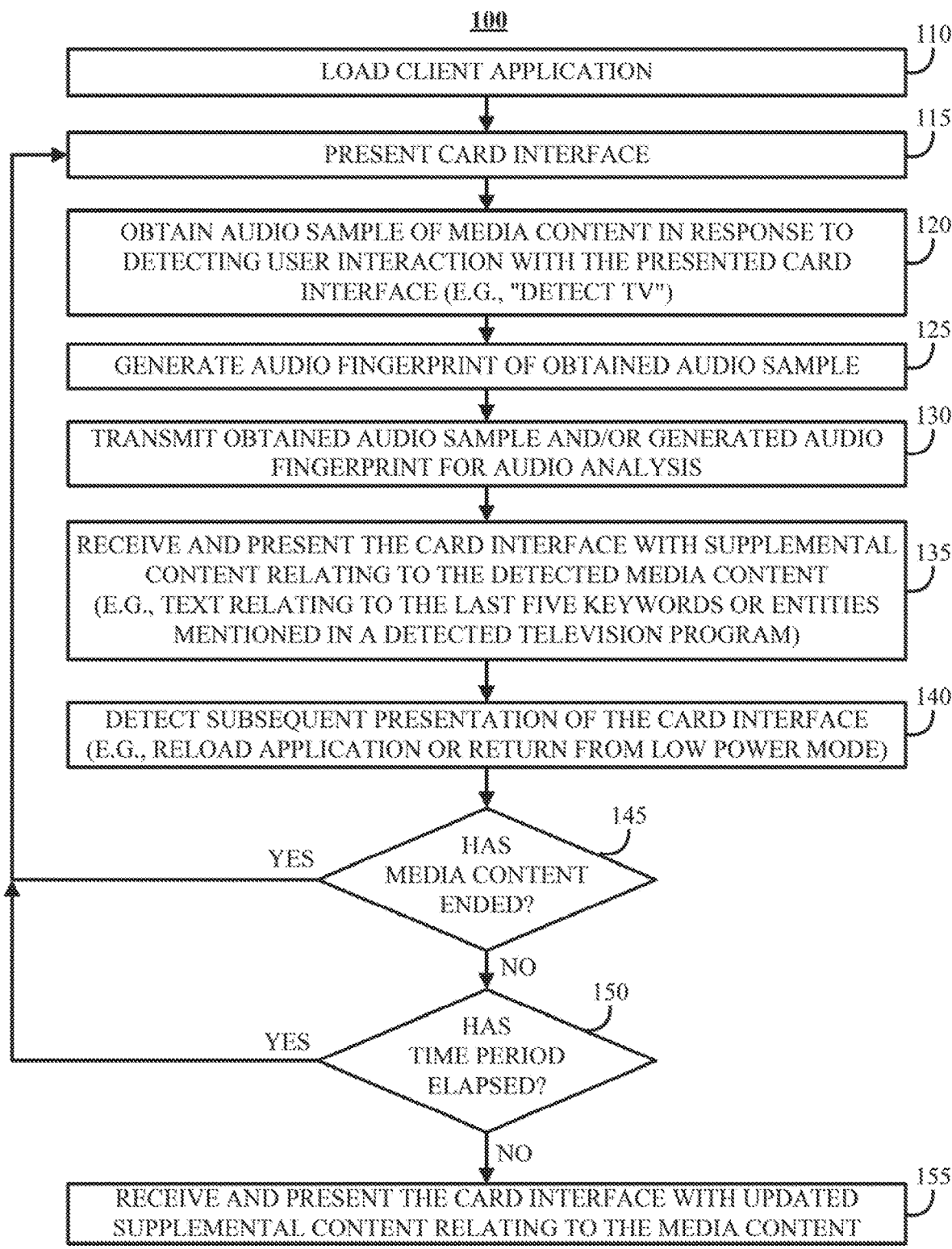
FIG. 1 is a flowchart of an illustrative process for providing media guidance with supplemental content items using one or more recommendation interfaces in accordance with some implementations of the disclosed subject matter.

In accordance with various implementations, as described in more detail below, mechanisms, which can include systems, methods, and computer-readable media, for presenting supplemental content relating to media content are provided.

Generally speaking, a supplemental content item from one or more content sources can be provided in a recommendation interface. For example, multiple recommendation interfaces can be concurrently presented to the user, where one particular recommendation interface can provide a supplemental content item related to a program currently being presented. In a more particular example, the supplemental content item can be related to the particular portion of the program currently being presented. Such a recommendation interface can include a supplemental content item, information relating to the supplemental content item (e.g., a title, a source, a thumbnail image, a preview, one or more relevant keywords, etc.), and an option to obtain the supplemental content item from a particular content source. It should be noted that other suitable recommendation interfaces can also be presented, such as interfaces that present programs or other media content information that the user is likely to be interested in consuming.

In some implementations, the supplemental content item provided by a selected content source can be presented as a recommendation interface or a content interface. In a more particular example, the recommendation interface can be presented as a recommendation card or any other suitable user interface that presents information to the user. In this example, a user can load a client application on a mobile device, where the client application presents the user with an opportunity to interact with one or more cards that include, among other things, supplemental content items relating to media content presented by a media playback device. Additionally or alternatively to loading a client application, a media playback device can be detected using one or more discovery protocols and, in response to such a detection, the user can be presented with an opportunity to interact with one or more recommendation cards. In a more particular example, in response to detecting that a client application has been launched or in response to detecting the presence of a media playback device, such as a television device, supplemental content items relating to media content presented by a media playback device can be presented in one or more recommendation cards.

In some implementations, in response to determining that a user has re-visited the client application or re-visits a particular recommendation card including a supplemental content item, the recommendation card can be updated to include another supplemental content item relating to the previously identified program. For example, in response to receiving state information from a mobile device that indicates the user has returned to a client application or recommendation card presented by the client application, the recommendation card can presented an updated supplemental content item to the user that includes interesting and/or relevant details for the previously identified program.

In some implementations, an updated supplemental content item can be presented on a recommendation card in response to receiving an indication that the mobile device returned from a display inhibited state in which presentation of the content interface was inhibited. For example, in response to determining that the mobile device executing the client application has transitioned from a low power state, a sleep state, or a power conservation state to an unlocked state, an updated supplemental content item can be retrieved and presented within the recommendation card, where the updated supplemental content item relates to the previously detected program.

In some implementations, an updated supplemental content item can be presented on a recommendation card in response to receiving an indication that the mobile device has returned and/or re-launched the client application. For example, in response to determining that the mobile device that was previously executing the client application has returned to presenting the client application, an updated supplemental content item can be retrieved and presented within the recommendation card, where the updated supplemental content item relates to the previously detected program.

Although the implementations described herein generally relate to presenting a user with a recommendation interface including a supplemental content item, such as a recommendation card in an application executing on a mobile device, this is merely illustrative. For example, the application can be implemented on a television platform. The application executing on a television device can retrieve supplemental content items in response to determining a currently viewed program and present the user with supplemental content items.

Turning to FIG. 1, an illustrative example 100 of a process for presenting supplemental content items based on media content is shown in accordance with some implementations of the disclosed subject matter. At 110, a computing device can load a client application that presents supplemental content items based on media content. For example, the computing device can be a mobile device (e.g., a cellular telephone, a smartphone, a tablet computing device, a wearable computing device, etc.).

It should be noted that the media content can include one or more programs (e.g., a news program, a talk show, a sports program, etc.) from various sources, such as programs broadcast over-the-air, programs broadcast by a cable television provider, programs broadcast by a telephone television provider, programs broadcast by a satellite television provider, on-demand programs, over-the-top programs, Internet content, streaming programs, recorded programs, etc.

Figure 4:
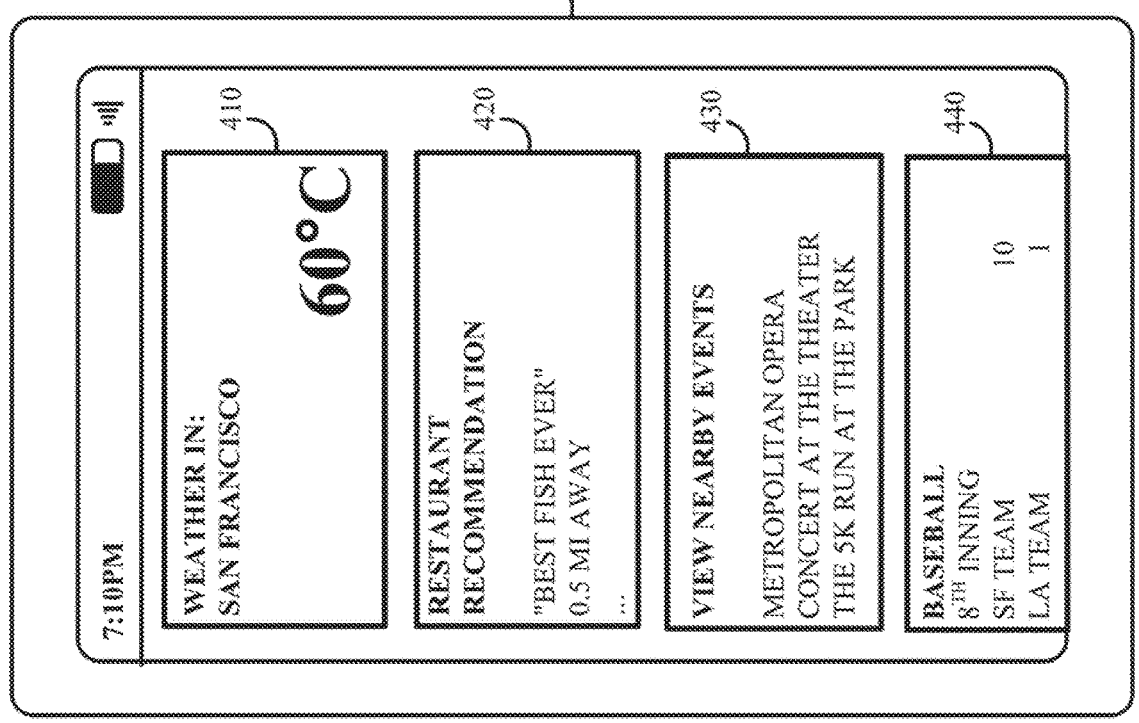
FIG. 4 is an illustrative screen of recommended items in the form of recommendation cards in accordance with some implementations of the disclosed subject matter.
Figure 6:
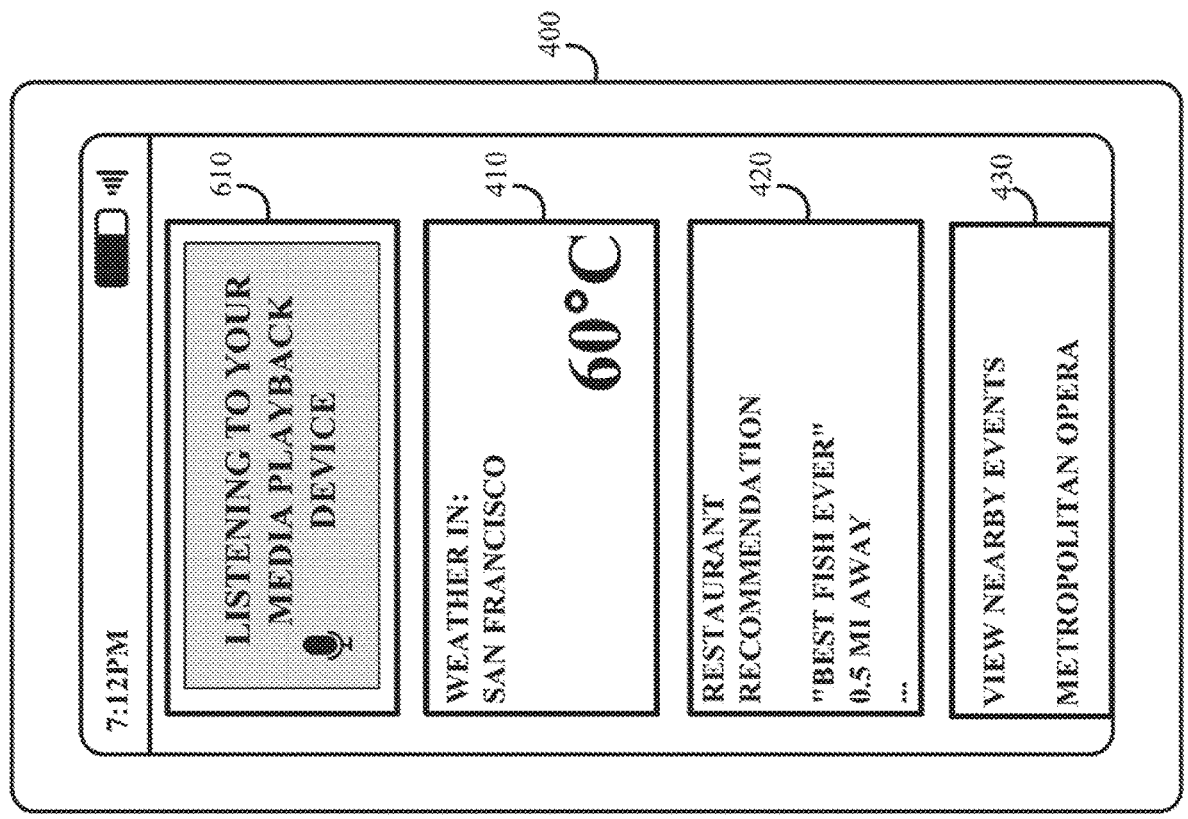
FIG. 6 is an illustrative screen of a mobile device that presents recommended cards including an indication that the mobile device is receiving audio data corresponding a program currently being presented on a media device in accordance with some implementations of the disclosed subject matter.
Figure 6:
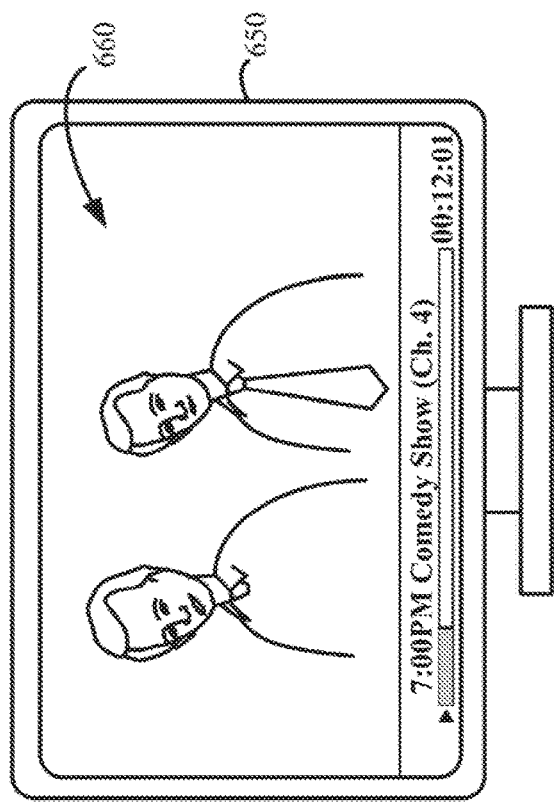

At 115, once the client application is loaded, one or more recommendation interfaces can be presented. For example, as shown in FIG. 4, an individual card can present the current or forecasted weather in a location which is determined to be of interest to the user, as shown in card 410. As another example, an individual card can present restaurant recommendation information at a location which is determined to be of interest to a user, as shown in card 420. As yet another example, an individual card can present a suggestion of nearby events at a location which is determined to be of interest to a user, as shown in card 430. As yet a further example, an individual card can present a suggestion of sports news and/or scores which is determined to be of interest to a user, as shown in card 440. Presentation of cards can include presentation of any suitable images, icons, graphics, videos, animations, sounds, haptic feedback, or any other suitable accompanying content. For example, in some implementations, presentation of a card can include presenting an accompanying sound (e.g., a tone, a verbal description of the card content, or any other sounds) or accompanying haptic feedback (e.g., vibration of a mobile device). Although there are four cards in the set of cards shown in FIG. 4, any suitable number of cards (including none) can be presented to a user.

Figure 5:
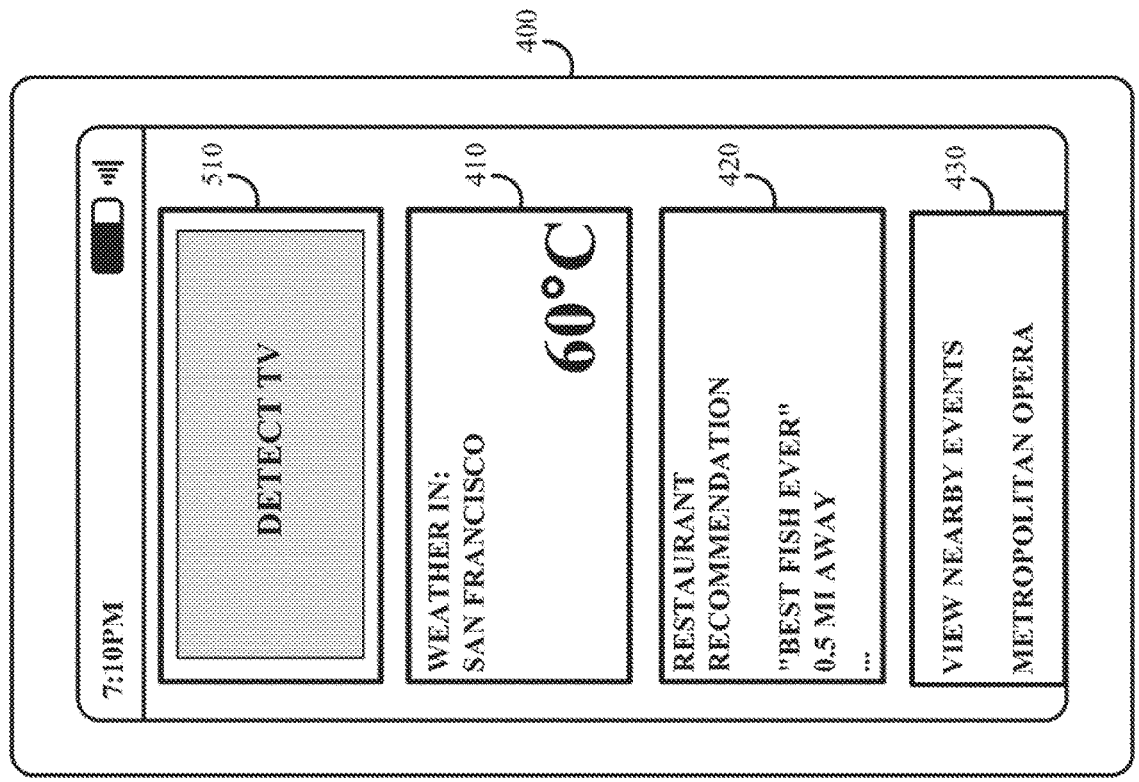
FIG. 5 is an illustrative screen of recommended cards that includes an initial supplemental content item in accordance with some implementations of the disclosed subject matter.

As shown in FIG. 5, in some implementations, an initial supplemental content recommendation card 510 can be presented. For example, supplemental content recommendation card 510 can present an initial card prompting the user to detect the currently presented program. In a more particular example, recommendation card 510 can present an initial card that includes the prompt "DETECT TV."

It should be noted that, in some implementations, the initial supplemental content recommendation card 510 can be presented in response to detecting the presence of a media playback device. For example, media device discovery can be initiated on the network to which the computing device (e.g., the mobile device) is connected. When the computing device is a mobile device, media device discovery can be initiated by the mobile device at any suitable time and for any suitable reason or reasons. For example, the client application running on the mobile device can initiate media device discovery to determine whether the mobile device is on the same network as a digital media device, such as a digital media server or a digital media renderer. In another example, the client application running on the mobile device can initiate media device discovery in response to initiating the client application.

In a more particular implementation, a full discovery protocol can be executed that causes the computing device to send a User Datagram Protocol (UDP) multicast message on the current network. In some implementations, the UDP can include an M-Search message directed to media devices, such as digital media renderers and/or digital media servers (e.g., as defined in DLNA Guidelines, December 2011, Part 1: Architecture and Protocols" technical specification, which is hereby incorporated by reference herein in its entirety), digital media players, or any other suitable media device that outputs, processes, and/or presents media content. In some implementations, the UDP multicast message can include an address of the device sending the message (e.g., the network address of the computing device), and can include a time period during which replies are to be sent. Such a time period can be any suitable time period, such as one second, two seconds, etc., and can be set based on any suitable factors. An example of simple device discovery protocol (SSDP) is described in "UPnP™ Device Architecture 1.1" technical specification as revised Oct. 15, 2008, which is hereby incorporated by reference herein in its entirety. In some implementations, SSDP as used herein can be a modified form of SSDP and may add elements and/or omit elements as compared to SSDP as described in "UPnP™ Device Architecture 1.1".

Referring back to FIGS. 4 and 5, although not shown in FIGS. 4 and 5, in some implementations, recommendation cards or interfaces can be interacted with by a user. For example, a card can be removed from user interfaces if a user is not interested or is no longer interested in the information presented on the card. As another example, a card can be "selected" to perform an action or present more information. As a more particular example, if a card which displays a supplemental content item available from a particular content source is presented, the card can be selected, and in response, an action can be performed, for example, access the particular content source or an application associated with the particular content source to obtain and present the supplemental content item. Cards can be interacted with in any suitable way. For example, in some implementations, cards can be dismissed by clicking or tapping on the card or on a "dismiss" icon (e.g., an "X" at the corner of the card or any other suitable icon). As another particular example, in some implementations, cards can be dismissed by "swiping" or "dragging" the card off the border of user interfaces. Similarly, cards can be selected by clicking, tapping, or any other suitable mechanism.

Referring back to FIG. 1, the client application can enter a program detection mode at 120, which can begin by obtaining an audio sample of the television programming currently being presented. For example, in response to selecting the initial supplemental content recommendation card 510 of FIG. 5 (e.g., the "DETECT TV" card), the client application can activate an audio input device coupled to the computing device, such as a microphone, where the audio input device captures and records the audio sample or any other suitable audio data associated with a presented television program. In another example, the client application can receive a user indication to store audio data for transmission to an audio matching service.

In a more particular example, in response to selecting the initial supplemental content recommendation card 510 of FIG. 5, which prompts the user to "DETECT TV," the client application executing on computing device 400 can present card 610, which indicates that computing device 400 is listening to media playback device 650. More particularly, the client application can active an audio input device coupled to computing device 400, where the audio input device captures and records an audio sample or any other suitable audio data associated with the currently presented program 650 (e.g., "The Comedy Show" program on channel 4).

In some implementations, the client application can activate an audio input device that captures audio from its surroundings and uses appropriates filters and/or other audio enhancements to extract an audio fingerprint or filtered audio data associated with the presented television program. For example, silent portions of the audio sample can be removed to reduce the file size of the audio sample. In another example, portions of the audio sample having distortion can be removed to reduce the file size of the audio sample. In yet another example, in response to determining that at least a portion of the audio sample does not include audio data having a given quality, the client application can prompt the user of the client application to record another audio sample.

In some implementations, the client application executing on the computing device can generate an audio fingerprint of the audio sample using any suitable audio fingerprinting technique at 125. The audio fingerprint can be a digital representation generated from the received audio sample, where the audio fingerprint can be used to identify the same or similar portions of audio data. Alternatively, the client application can transmit the audio sample associated with the television program to a search system or an audio matching system that generates an audio fingerprint.

At 130, the client application can transmit the obtained audio sample and/or the audio fingerprint for analysis. For example, upon launching the client application and activating the audio input device, the client application can automatically stream the audio sample and/or the audio fingerprint to a search system that accesses a matching service (e.g., an audio fingerprint matching service). As described above, the client application can stream the audio sample to a search system, where the search system generates an audio fingerprint corresponding to the audio sample and transmits the audio fingerprint to an audio fingerprint matching service for analysis.

In some implementations, additional information can be transmitted along with the audio sample, such as media device information, user profile information, location information, user preferences, timing information, and other information that can be used to generate a search query associated with the audio sample of the television program.

It should be noted that in implementations described herein in which the client application (or other mechanisms described herein) collects information about a particular user, the user can be provided with an opportunity to control whether the client application collects information about particular users and/or how collected user information is used by the client application. Examples of information about a user can include the user's interests and identifying information of the user (e.g., a user profile, user credentials, device identification, etc.). Additionally, certain information about the user can be stored locally (e.g., not shared), encrypted, and/or treated in one or more ways before it is stored to remove personally identifiable information. For example, the client application can store user preferences and/or user interests for a particular user with an anonymous user identifier (e.g., a user identifier that is not associated with the user's name, the user's username and/or password, the user's email address, etc.). Using these techniques, the user can have control over what information is collected about the user and/or how that information is used by the client application.

Figure 2:
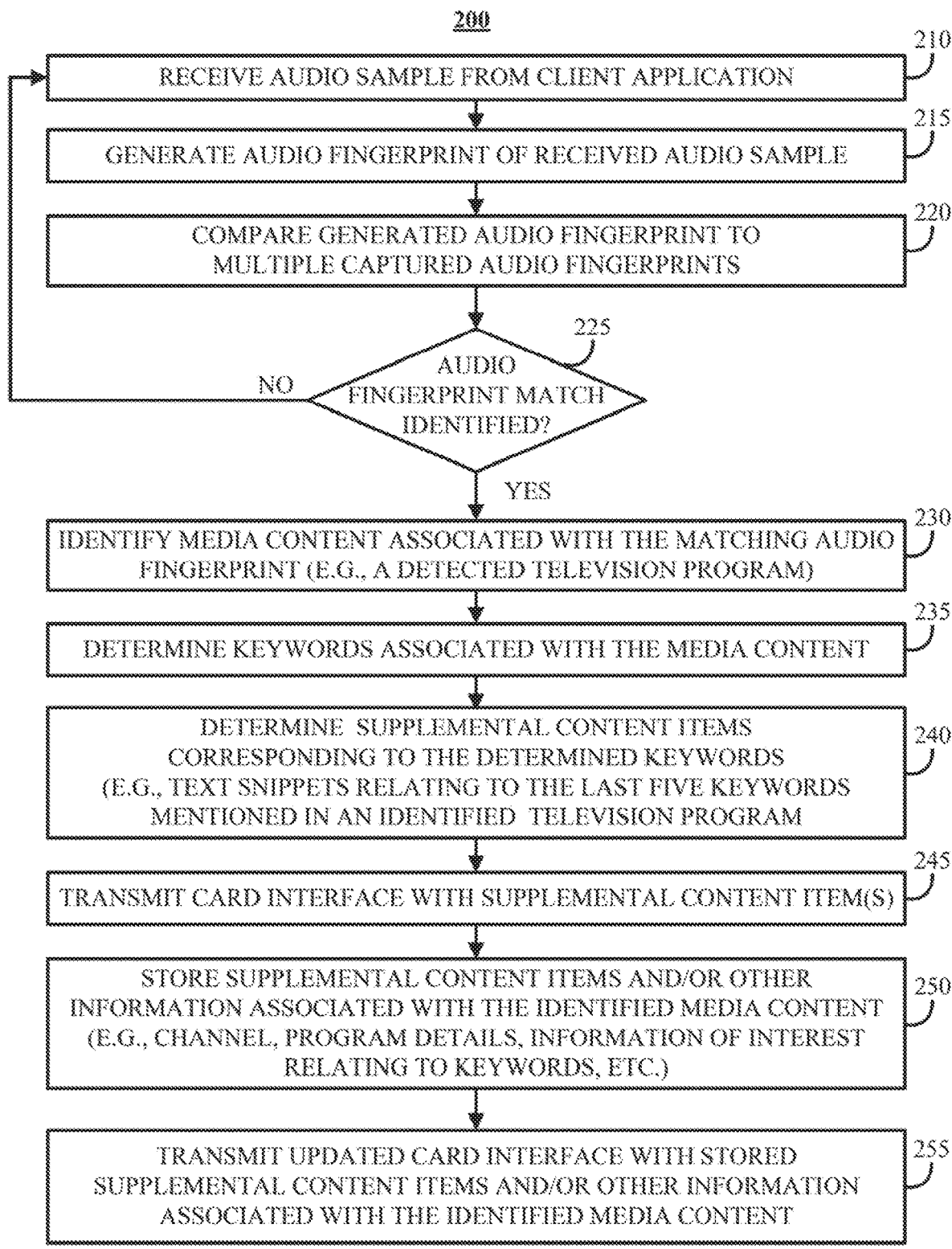
FIG. 2 is a flowchart of an illustrative process for selecting supplemental content items relating to an identified media content item in accordance with some implementations of the disclosed subject matter.

Turning to FIG. 2, upon receiving the audio sample and/or other additional information from the client application at 210, an audio fingerprint of the received audio sample can be generated at 215. Again, the audio fingerprint can be generated by the client application or any other suitable application and transmitted to the search system or an audio fingerprint matching system for analysis.

At 220, the search system can compare the generated audio fingerprint to multiple audio fingerprints. For example, the generated audio fingerprint associated with the audio sample from the client application can be compared against a subset of stored audio fingerprints. In another example, the generated audio fingerprint associated with the audio sample from the television program can be compared against program audio fingerprints that are stored and indexed by media content item in a database. In a more particular example, the search system can access a database or other suitable storage device containing multiple audio fingerprints and filter the multiple audio fingerprints to a subset of audio fingerprints based on location information, user preferences, and other information received from the client application. In this example, only audio fingerprints associated with the received location information can be used to compare with the generated audio fingerprint. In another example, particular audio fingerprints from the database or storage device can be used for comparison before others, such as audio fingerprints associated with popular programs, newer audio fingerprints, audio fingerprints commonly matched, etc.

In some implementations, the search system can, for example, include capture modules that receive and process signals from multiple sources (e.g., multiple channels). These capture modules can, for each channel, capture video screenshots at particular time intervals (e.g., every two or three seconds) and/or generate audio fingerprints from audio data at particular time intervals. Generally speaking, these capture modules can monitor media content from multiple content sources and generate video screenshots, audio fingerprints, and/or any other suitable content identifier. More particularly, these capture modules can store the generated video screenshots, audio fingerprints, and other content identifiers in a storage device. For example, a capture module can monitor channels providing broadcast television content and store generated audio fingerprints in a database that is indexed by program and time.

It should be noted that, in some implementations, generated video screenshots, audio fingerprints, and other content identifiers indexed by program and time in a database can be discarded after a predetermined time. For example, in response to determining that a video screenshot is associated with a time outside of a particular time window, the search system or any other suitable component can remove the video screenshot from the database.

At 225, it can be determined whether a match is found. If no matching audio fingerprint is found, the search system can return to 210 and wait to receive additional audio samples from the client application. Additionally or alternatively, the search system can transmit a message to the client application requesting that the user restart the client application, transmit another audio sample (e.g., select the "DETECT TV" prompt again), and/or input or verify particular information (e.g., program information, such as channel number, service provider information, program title, etc.).

For example, the matching audio fingerprint can be associated with a program and the search system can use this association to determine that the user of client application is watching the program provided on a particular channel. In another example, the search system can transmit a notification to the client application that the program has been identified. This notification can include, for example, an indication that the search system has successfully identified the program from the received audio sample. In some implementations, in response to the user of the client application determining that the identified program is incorrect, the client application can provide the user with an opportunity to indicate the correct program or transmit another audio sample.

It should be noted that, in some implementations, the client application can initiate the program detection mode without capturing audio information or using audio fingerprints (e.g., steps 120-130 of FIG. 1 and steps 210-225 of FIG. 2).

In some implementations, the search system can include identifying a program by detecting the program that a media playback device (which is connected to the mobile device) is currently playing back. For example, the search system can transmit a query to the mobile device to determine which devices are connected to the mobile device. In response to determining that a media playback device, such as a television device, a gaming device, or a set-top box, is connected to the mobile device, the search system can instruct the client application to communicate with the media playback device to determine the program that the media playback device is currently presenting.

In some implementations, the search system can transmit a card 710 (or transmit updated information for the previously presented recommendation card) to the client application that indicates a program or other media content item has been identified. For example, the client application executing on computing device 400 has identified that the program 660 currently being played back on media device 650 is "The Comedy Show" as shown in card 710 of FIG. 7. In some implementations, additional program-related information, such as start time, end time, current progress, program title, episode number, series number, channel number, and network information, can be identified and associated with the identified program. For example, as also shown in card 710 of FIG. 7, the program title, the start time, the end time, the channel number, the network call sign, and the time zone are determined and presented within recommendation card 710.

In some implementations, in response to identifying the program, the search system or any other suitable system can determine keywords associated with the identified program at 235 and determine whether supplemental content items exist corresponding to the determined keywords at 240. For example, in response to identifying a program, the search system can extract keywords mentioned in the identified program within the past X minutes (e.g., five minutes). This can include, for example, accessing a timeline associated with the identified program and determining whether one or more keywords or any other suitable entity information have been placed on the timeline for that period of time.

In a more particular implementation, the search system can, for example, include capture modules that receive and process signals from multiple sources (e.g., multiple television channels including television programs that are broadcasted by one or more television providers). These capture modules can, for each channel, process television programs as each program is being broadcast. For example, in response to receiving frames (e.g., frames of live television program), these capture modules can process the frames to determine whether at least one of the frames includes an object of interest using one or more of: an object recognition technique to identify objects, landmarks, places, etc. that are shown in a frame, a facial recognition technique to identify faces of actors, actresses, and/or characters that appear in a frame, and/or optical character recognition to identify text portions, such as a telephone number, a website address, a business name, a product name, etc. In another example, these capture modules can extract keywords and/or entity information that is included in subtitle information corresponding to the program. In yet another example, these capture modules can determine topics that are being discussed in a program (e.g., by processing audio data and/or an audio fingerprint). In a further example, these capture modules can identify a song that is played in a program (e.g., by processing audio data and/or an audio fingerprint). Upon performing this analysis, the object of interest can be associated with a content item. For example, the content item can include a selectable link that can be associated with an identified text portion that includes a website address or a business name. In another example, the content item can be a selectable link or a text snippet corresponding to a news article, web content, or any other suitable content that discusses an extracted keyword or an identified topic. In yet another example, the content item can be a selectable link directed to a music provider for playing and/or purchasing the identified song in the program.

In some implementations, these capture modules can store the content items as supplemental content items in a storage device. For example, a capture module can monitor channels providing broadcast television content and store supplemental content in a database that is indexed by program and time. In a more particular example, a capture module can store a supplemental content item along with timestamped audio and image fingerprints for every N millisecond in a database while a program is being broadcasted by a television provider or any other suitable content provider.

In a more particular implementation, the search system can determine the last five keywords mentioned in the identified program in response to receiving a request to provide a supplemental content item. In response, the search system can use the determined keywords to select a subset of supplemental content items for presentation to the user. It should be noted that the supplemental content items can be presented in any suitable manner (e.g., all at once, one at a time until a predetermined time has elapsed, in order of popularity or recency, etc.). For example, the search system can rank the keywords based on popularity information (e.g., search score, mentions in social media, trending keywords, most searched for entities in a particular program, etc.) and obtain supplemental content items relating to the most popular keywords. In another example, the search system can extract keywords mentioned within the program that match a keyword included in a list of particular keywords (e.g., popular topics, popular entities, etc.) and retrieve supplemental content items relating to the extracted keywords.

Referring back to FIG. 2, in response to determining one or more keywords associated with the identified program, the search system can determine whether supplemental content items corresponding to the determined keywords are available and obtain supplemental content from such a database. For example, in response to determining that supplemental content for a particular episode of a particular program is available from one or more capture modules, the search system can access the portion of the database corresponding to the particular episode of the particular program and obtain the supplemental content items. In a more particular example, the supplemental content items corresponding to the particular episode of the program can be timestamped to relate to particular portions of the program.

Alternatively, the search system can instruct the client application to obtain supplemental content corresponding to keywords from one or more servers (e.g., capture servers). In response, the supplemental content can be locally stored in a suitable storage device associated with the computing device.

It should be noted that a supplemental content item can include a snippet of the content item, a thumbnail image of the content item, a link or uniform resource locator (URL) to the supplemental content (e.g., a webpage having a full article describing content mentioned in a program), etc.

At 245, the supplemental content item can be transmitted to the client application for presenting to the user. For example, a supplemental content item, such as a snippet of content related to the television program that the user is currently watching, can then be transmitted back to the client application executing on the mobile device for review and/or selection by the user of the client application. In another example, a recommendation card that includes the supplemental content item can be transmitted to the client application for presentation as one of the multiple recommendation cards provided by the client application.

In some implementations, at 250, the supplemental content items and/or recommendation cards that include one or more supplemental content items can be stored along with information associated with the identified program. For example, the supplemental content items related to the identified program can be associated with program information (e.g., channel, program details, keyword information, etc.). In a more particular example, the search system can associate and store the supplemental content items, recommendation cards, and other media information such that, in response to detecting a subsequent request for supplemental content information relating to the previously identified program, the search system can retrieve a stored supplemental content item and/or any other program-related information.

Referring back to FIG. 1, the supplemental content item relating to the program can be presented to the user at 135. For example, the client application can allow the user to scroll through different supplemental content items (e.g., text snippets, URLs to full articles, thumbnail images, etc.), where the user can scroll vertically or horizontally on the computing device. In another example, the client application can automatically present the user with a single supplemental content item that corresponds to the program. In this example, the obtained supplemental content items can be ranked based on any suitable criterion (e.g., popularity) and presented one at a time to the user.

Figure 7:
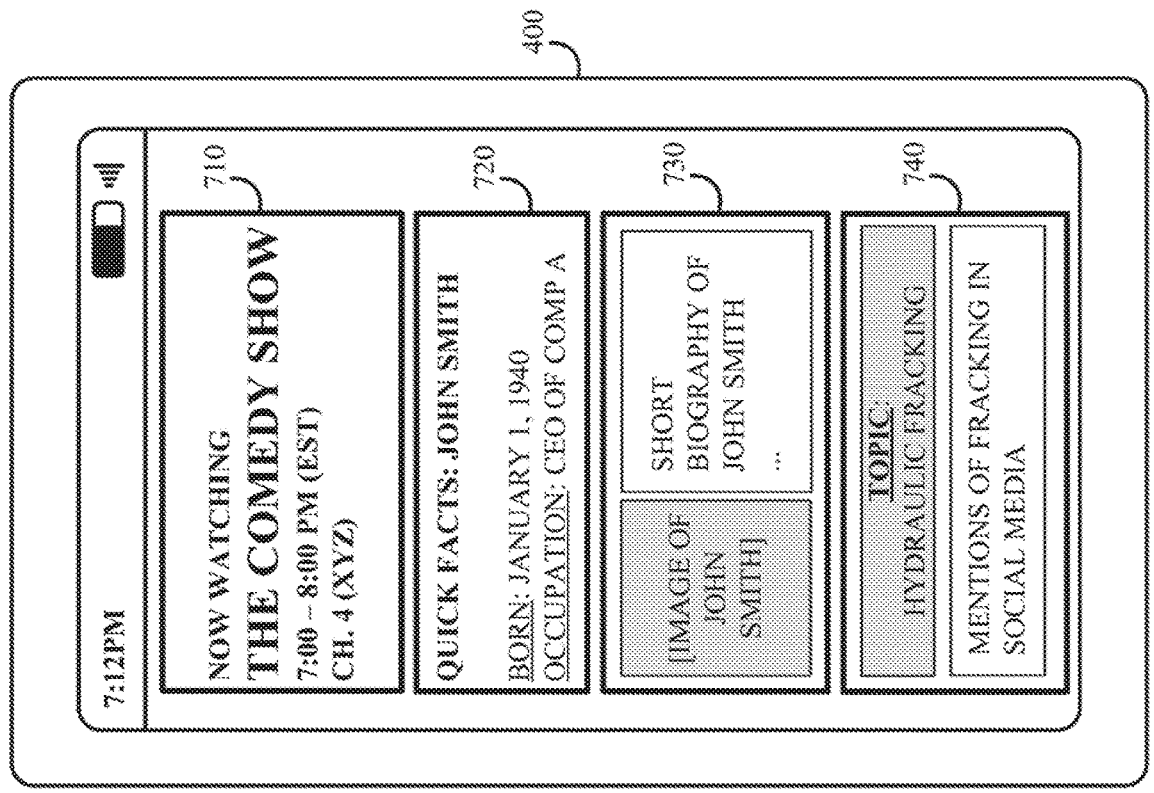
FIG. 7 is an illustrative screen of a mobile device that presents recommended cards including program-related information corresponding to an identified program and supplemental content items related to the identified program in accordance with some implementations of the disclosed subject matter.
Figure 7:
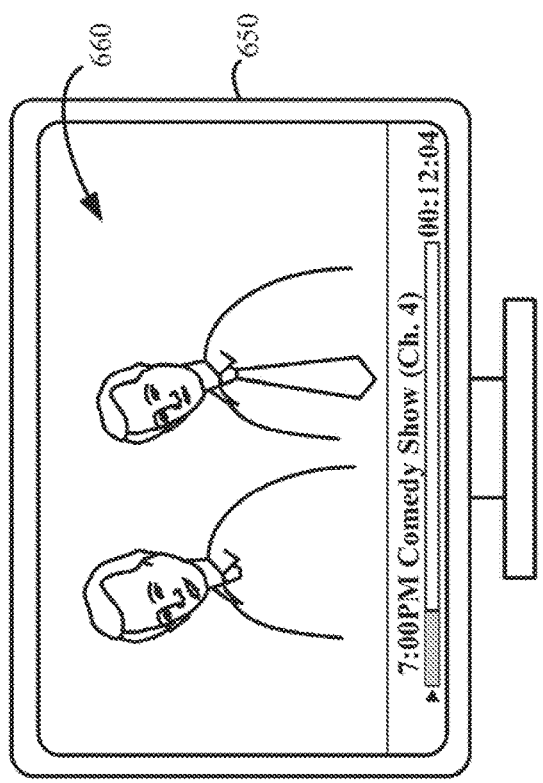

As shown in FIG. 7, recommendation cards 720, 730, and 740 each include a supplemental content item. For example, in response to determining the keywords "John Smith" and "hydraulic fracking," cards 720 and 730 that provide text snippets, thumbnail images, links, and/or other supplemental content relating to "John Smith" and card 740 that provides social media snippets relating to the topic "hydraulic fracking" can be presented to the user of the client application.

In response to receiving and presenting the supplemental content item to the user, the client application can allow the user to select a news item from multiple supplemental content items. For example, the client application can detect when the user has placed a highlight region over a supplemental content item and pressed a suitable button on the computing device. In another example, when the computing device is a mobile device with a touch screen, the client application can respond to contact with the touch screen, such as one or more taps on the touch screen, movement of the point of contact while maintaining continuous contact, etc.

In accordance with some implementations, the user of the computing device can instruct the computing device to exit the client application. Additionally or alternatively, the computing device executing the client application can enter a low power state, a sleep state, or a power conservation state. For example, the screen of the computing device can be turned off after a certain period of inactivity. In another example, the brightness of the screen of the computing device can be dimmed after a certain period of inactivity. In yet another example, the computing device can enter a state in which one or more features of the computing device are inhibited or operated at less than full capacity to conserve power of a power source, such as an internal battery.

At 140, the client application can detect that the client application has been revisited on the computing device. For example, the client application can detect that, in response to waking up the mobile device by selecting a button on the mobile device and/or interacting with the screen of the mobile device, the client application has been reactivated and recommendation cards including a recommendation card having a supplemental content item are presented. In another example, the client application can detect that a user has subsequently re-launched the client application on the mobile device. In response to such detections, the client application can transmit a request for an updated supplemental content item for presentation in the recommendation card.

In some implementations, the client application can determine whether the program or media content item has ended at 145. In response to determining that the previously identified program has ended, the client application can return to 115, where an initial recommendation card or other suitable interface can be presented. For example, the client application can present a recommendation card that prompts the user to detect another program. In a more particular example, initial card 510 of FIG. 5 can prompt the user to "DETECT ANOTHER PROGRAM."

In some implementation, the client application can determine whether a predetermined time period has elapsed for presenting supplemental content items at 150. For example, the client application can have a default time period (e.g., fifteen minutes) for presenting supplemental content items prior to prompting the user to detect another program. In another example, the client application can determine a time period set by the user of the client application (e.g., in user preferences associated with a user account). In response to detecting that the predetermined time period has elapsed for presenting supplemental content items, the client application can return to 115, where an initial recommendation card or other suitable interface can be presented. For example, the client application can present a recommendation card that prompts the user to detect another program. In a more particular example, initial card 510 of FIG. 5 can prompt the user to "DETECT ANOTHER PROGRAM."

Alternatively, in response to determining that the program has not ended at 145 and/or that the predetermined time period has not elapsed, at 150, the client application can transmit a request to the search system for an updated supplemental content item. It should be noted that, in some implementation, the updated supplemental content item corresponds to the previously identified program and can continue to be updated until the previously identified program ends or until the predetermined period of time has elapsed. For example, the updated supplemental content item can provide contextually relevant information relating to the identified program (e.g., based on the timestamp of the request for updated supplemental content).

Figure 3:
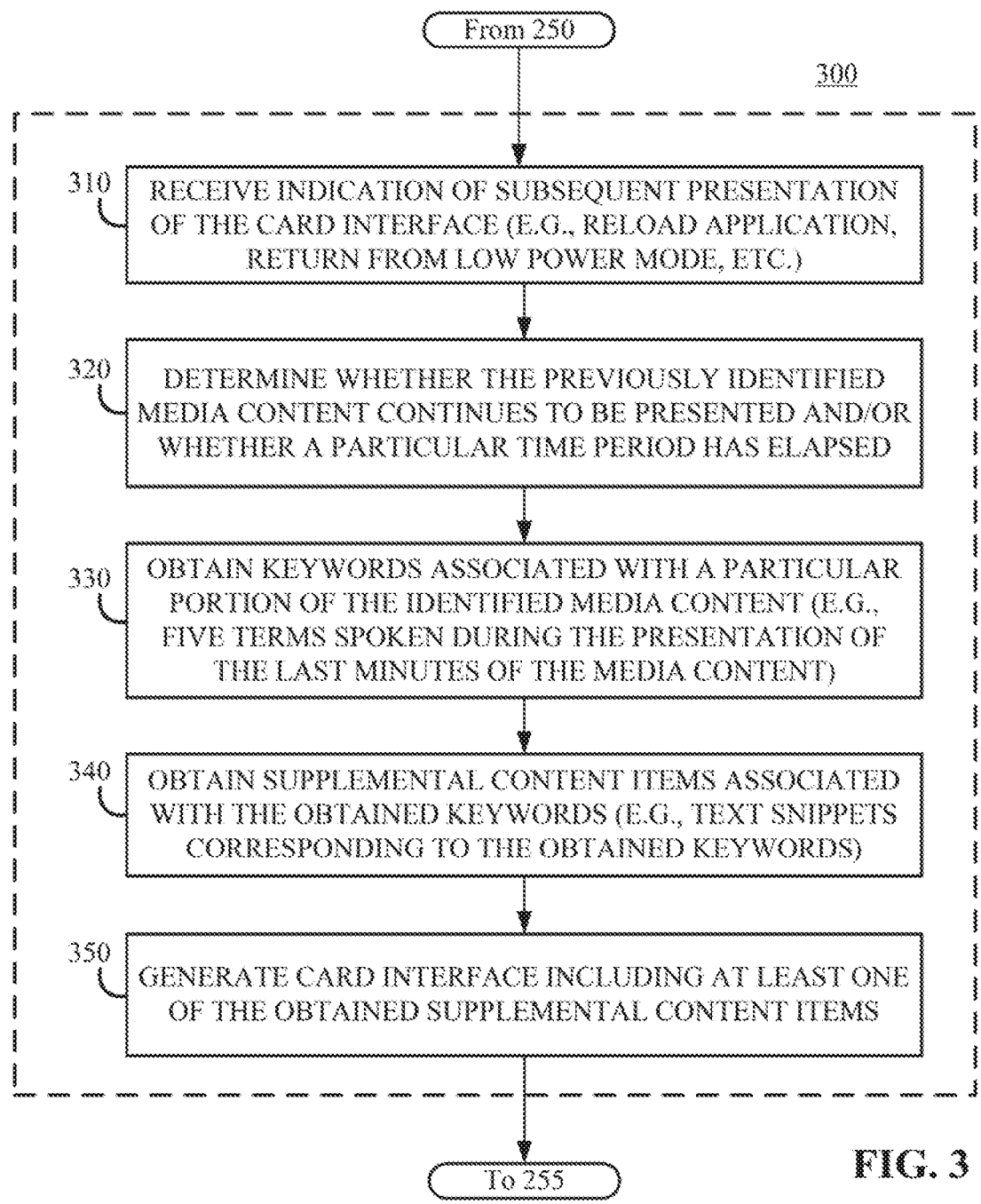
FIG. 3 is a flowchart of an illustrative process for generating a recommendation interface with updated supplemental content items in accordance with some implementations of the disclosed subject matter.

Turning to FIG. 3, an illustrative example 300 of a process for generating a card interface including an updated supplemental content item based on a previously identified program is shown in accordance with some implementations of the disclosed subject matter. At 310, the search system can receive an indication of a subsequent presentation of the card interface. As described above, the search system can receive an indication, from the client application, that the client application has been reloaded on the computing device and/or receive an indication, from the client application, that the client application has been re-presented on the computing device in response to returning from a low power state, a sleep state, or a power conservation state. Such an indication can be included in a request for an updated supplemental content item.

It should be noted that, in instances where a user using client application consents to the use of data such as state information (e.g., device state information relating to a return from a low power state, a sleep state, or a power conservation state and/or application state information relating to a return to the client application), such state information can be used to subsequently present supplemental content items.

In some implementations, additionally or alternatively to 145 and 150 in FIG. 1, the search system can determine whether the previously identified media content continues to be presented and/or whether a particular time period has elapsed at 320. For example, the search system can determine whether the previously identified program continues to be presented by comparing the timestamp associated with the request for updated supplemental content with media information associated with the program. In another example, the search system can determine whether a predetermined time period has elapsed since the initial request for supplemental content.

In some implementations, at 330 and 340, the search system can obtain keywords associated with a particular portion of the identified program and obtain supplemental content items associated with the obtained keywords. For example, the search system can process the identified program to determine the last five keywords mentioned during the presentation of the last five minutes of the program and obtain text snippets, thumbnail images, and links corresponding to the determined keywords. Alternatively, the search system can retrieve stored supplemental content items associated with the identified program. For example, as described above, the search system can associate and store the supplemental content items, recommendation cards, and other media information such that, in response to detecting a subsequent request for supplemental content information relating to the previously identified program, the search system can retrieve a stored supplemental content item and/or any other program-related information. In a more particular example, supplemental content items can be selected based on timing information—e.g., an initial supplemental content item based on popularity information, a subsequent supplemental content item based on current playback position of the program, etc. Timing information can, for example, be used to retrieve particular supplemental content items from a database or other suitable storage device of supplemental content items indexed by program and time.

Figure 8:
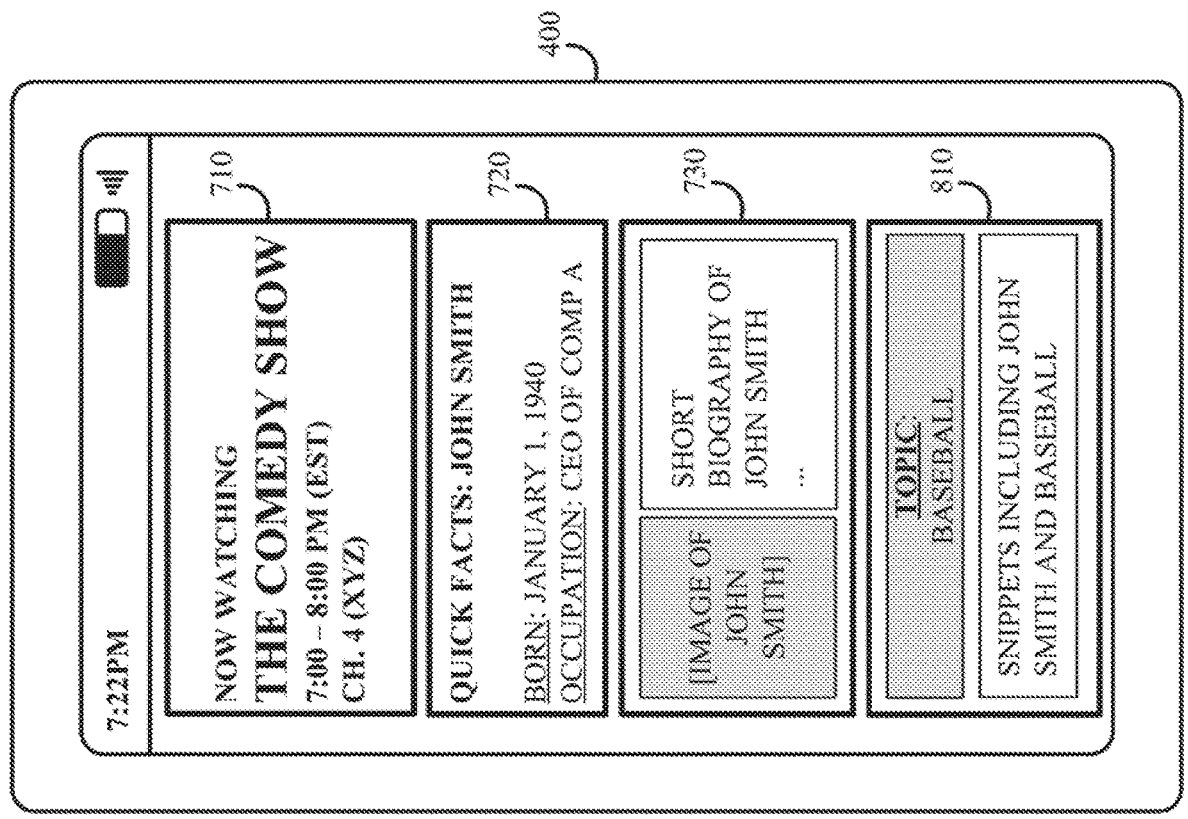
FIG. 8 is an illustrative screen of a mobile device that presents recommended cards including program-related information corresponding to an identified program and updated supplemental content items related to the identified program in accordance with some implementations of the disclosed subject matter.
Figure 8:
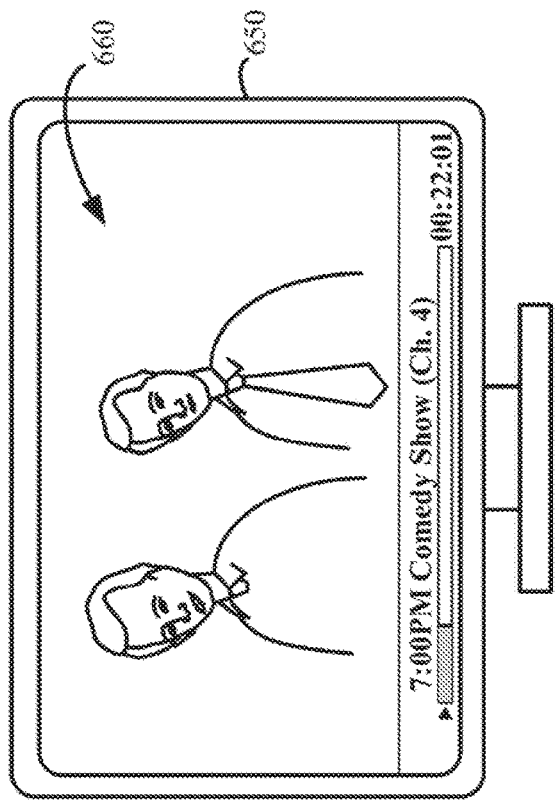

At 350, the search system can generate a card interface that includes at least one of the obtained supplemental content items. For example, the search system can generate and transmit a recommendation card that includes an updated supplemental content item for presentation to the user (e.g., at 155 of FIG. 1). In another example, the search system can transmit the updated supplemental content item for presentation to the user, where the client application receives the updated supplemental content item and renders a recommendation card that includes the updated supplemental content item. In a more particular example, as shown in FIG. 8, a recommendation card 810 that includes baseball-related supplemental content corresponding to previously identified program 660 can replace recommendation card 740 that included fracking-related supplemental content corresponding to a topic discussed in program 660. More particularly, the supplemental content included in recommendation card 810 can include content that relates to both "John Smith," a previously extracted keyword (which may still be contextually relevant to the program) and "baseball," a newly extracted keyword that is contextually relevant to the currently presented program.

In some implementations, recommendation cards or interface can be interacted with by a user. For example, a card can be selected to perform an action or present more information. In a more particular example, as shown in FIG. 9, in response to identifying program 660 and presenting program card 710 and one or more supplemental content items in card 810, the client application can present the user with one or more options for interacting with the recommendation cards.

As shown, the client application can present the user with option 910 to provide information relating to the identified program. For example, in response to selecting option 910, the client application can retrieve from search system or any other suitable system program-related information. In a more particular example, the client application can present keyword information, entity information, all of the obtained supplemental content items, and/or other information relating to the previously detected program.

Figure 9:
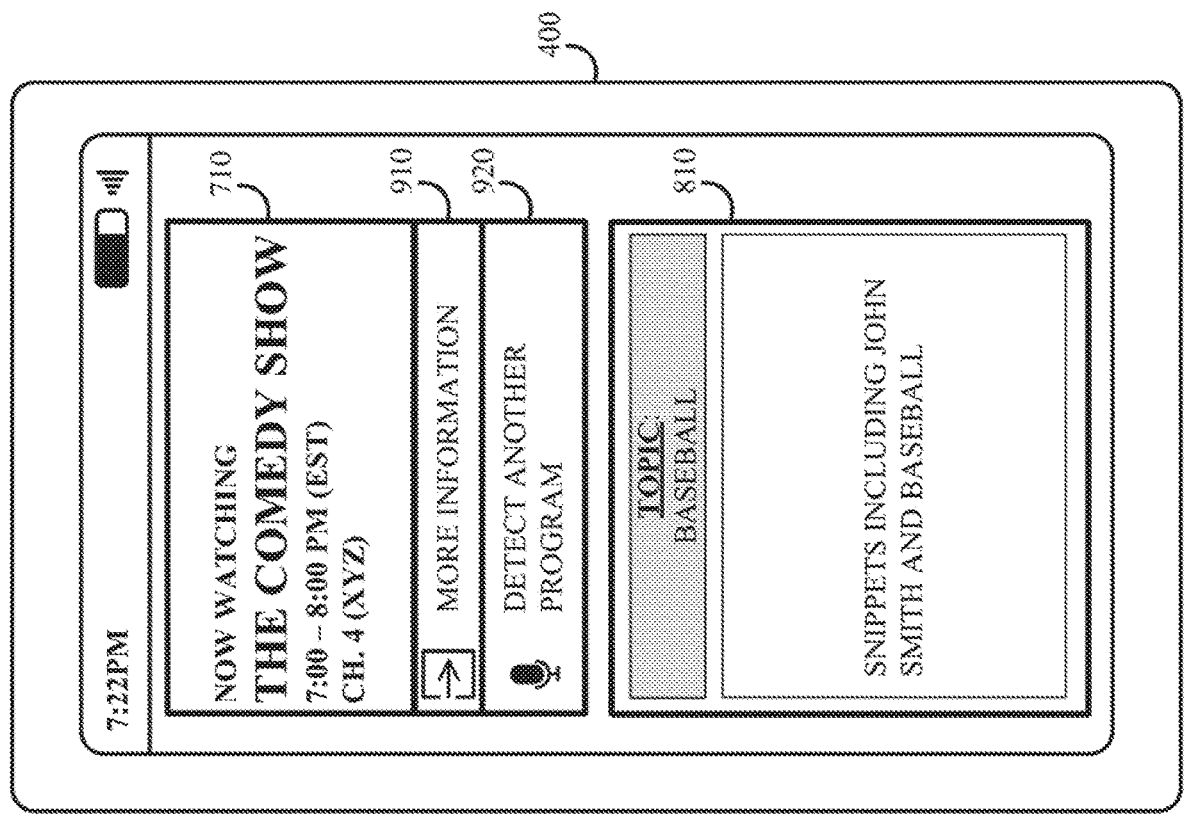
FIG. 9 is an illustrative screen of a mobile device that presents recommended cards including program-related information corresponding to an identified program, updated supplemental content items related to the identified program, and supplemental content options in accordance with some implementations of the disclosed subject matter.
Figure 9:
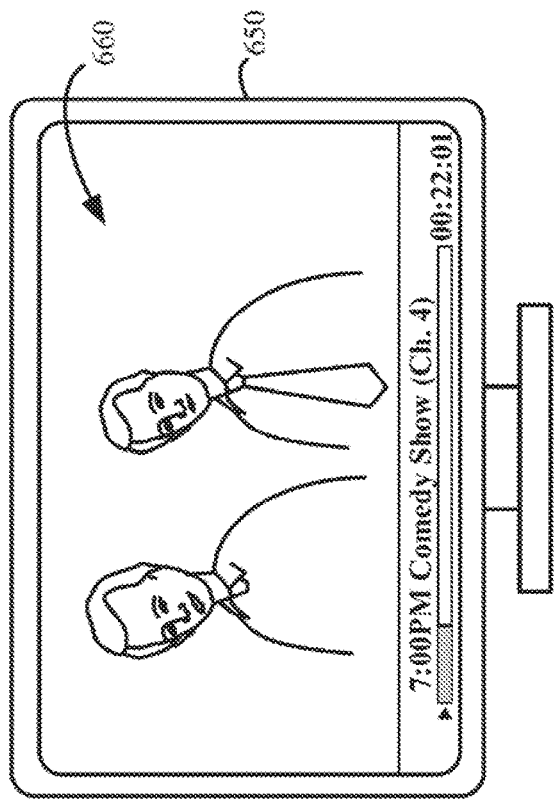

As also shown in FIG. 9, the client application can present the user with option 920 to identify another program. For example, although the client application is currently presenting supplemental content items and/or other program-related information corresponding to the previously detected program, the user may have changed channels on media device 650. In response to selecting option 920, the client application can enter the program detection mode, which can obtain an audio sample of the television programming currently being presented.

Figure 10:
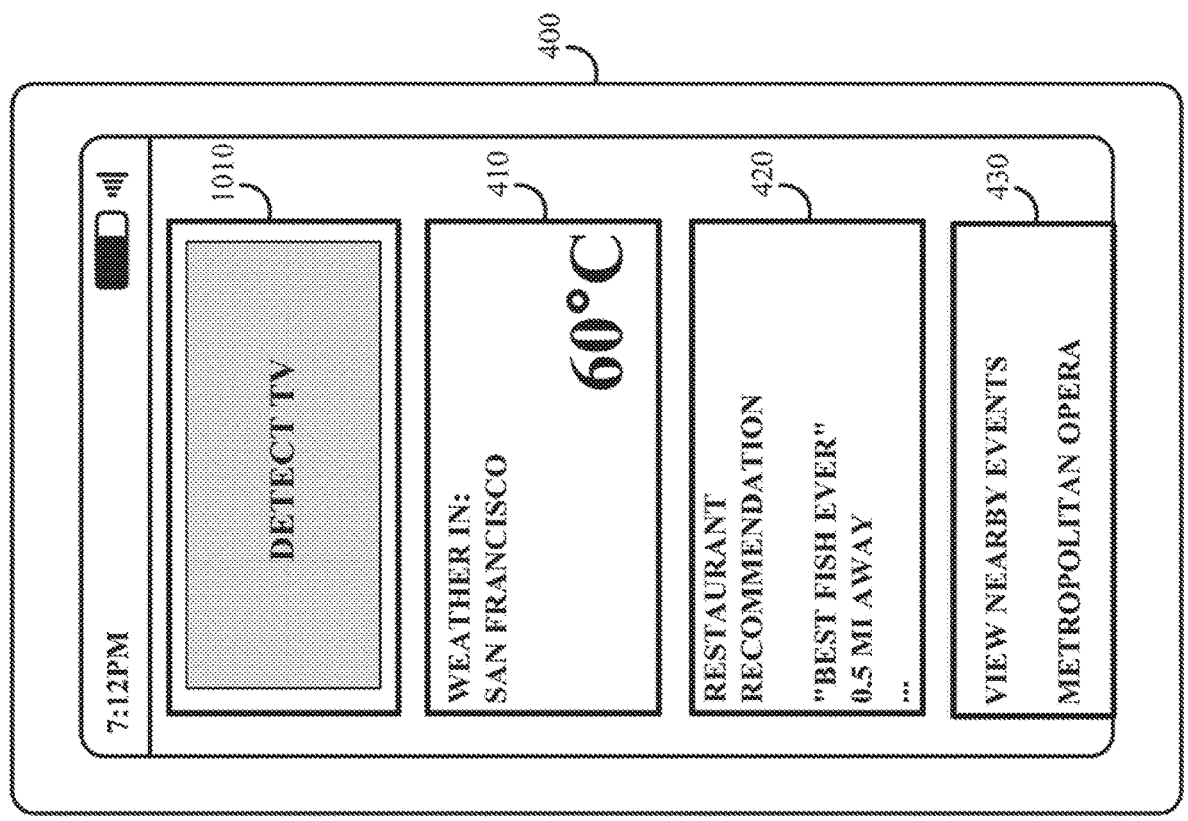
FIG. 10 is an illustrative screen of recommended cards that includes an initial supplemental content item in response to determining that the previously identified program has ended and/or a predetermined period of time has elapsed in accordance with some implementations of the disclosed subject matter.
Figure 10:
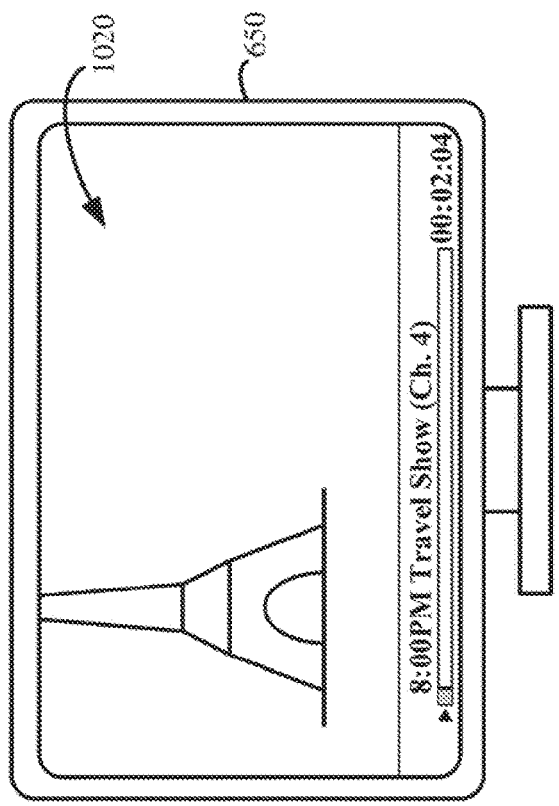

As described herein, in some implementations, the supplemental content items associated with an identified program can continue be presented on recommendation cards or interface until it has been detected that the program has ended and/or that a predetermined period of time has elapsed. For example, as shown in FIG. 10, in response to detecting that the previously identified program 660 has ended, the client application can cause an initial supplemental content recommendation card 1010 (e.g., the "DETECT TV" card) to be presented. In response to selecting the initial supplemental content recommendation card 1010, the client application can activate an audio input device coupled to the computing device, such as a microphone, where the audio input device captures and records the audio sample or any other suitable audio data associated with a presented television program 1020.

Figure 11:
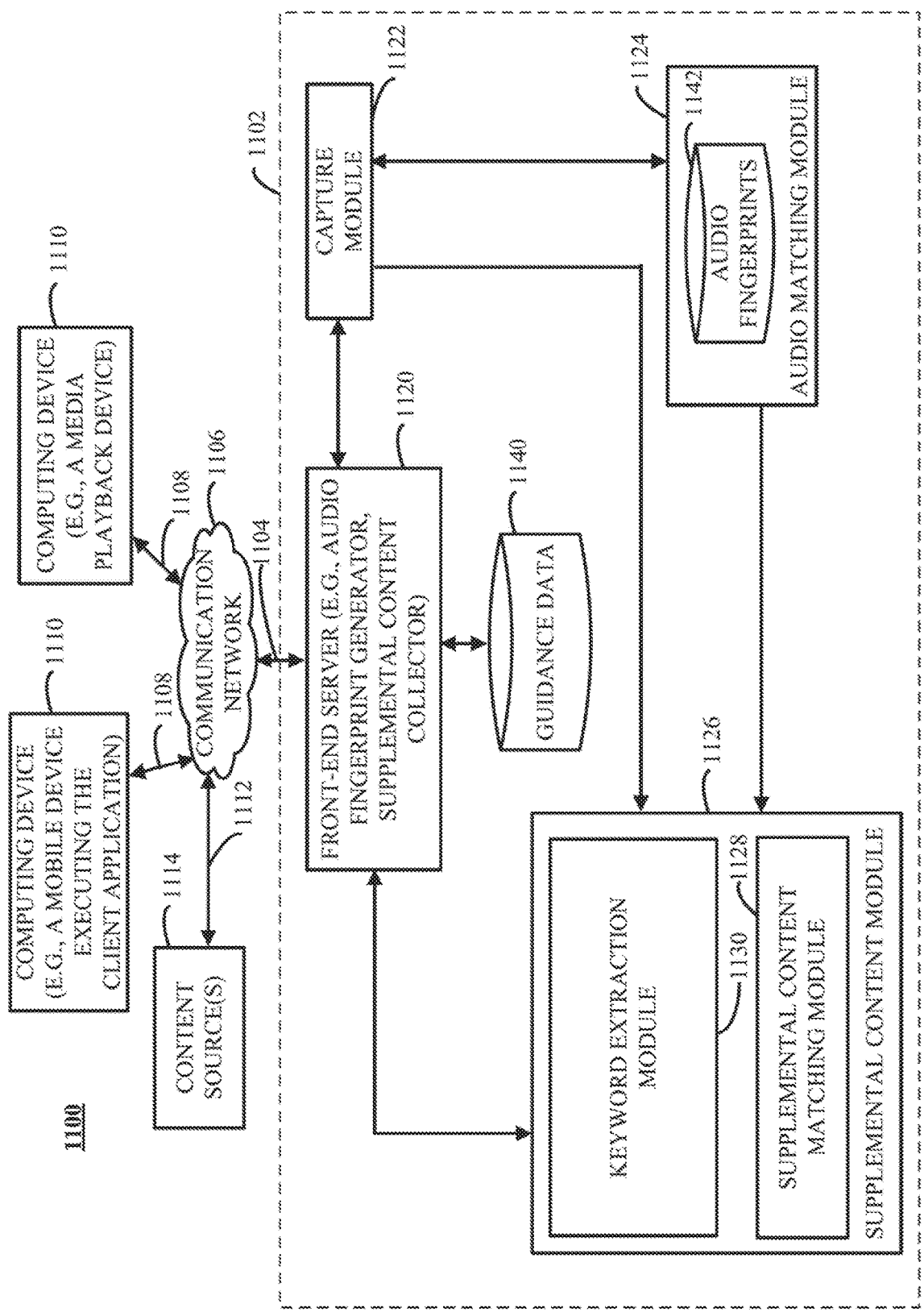
FIG. 11 shows a schematic diagram of an illustrative system suitable for implementation of the mechanisms described herein for providing supplemental content items, such as text snippets and URLs to content related to the context of the media content, in accordance with some implementations of the disclosed subject matter.

Turning to FIG. 11, an illustrative example 1100 of a generalized schematic diagram of a system on which the mechanisms for presenting supplemental content items based on media content is shown in accordance with some implementations of the disclosed subject matter. As illustrated, system 1100 can include one or more computing devices 1110. Computing devices 1110 can be connected by one or more communication links 1108 to a communications network 1106 that can be linked via a communications link 1104 to a server 1102. In some implementations, computing devices 1110 and server 1102 can be linked via a communications link 1112 to one or more content sources 1114.

System 1100 can include one or more servers 1102. Server 1102 can be any suitable server for providing access to the application, such as a processor, a computer, a data processing device, or any suitable combination of such devices. For example, the application can be distributed into multiple backend components and multiple frontend components and/or interfaces. In a more particular example, backend components, such as data collection and data distribution can be performed on one or more servers 1102.

In some implementations, front-end components of the application (or a portion of the application), such as a user interface and/or channel identification features can be performed on one or more computing devices 1110.

In some implementations, each of the computing devices 1110 and server 1102 can be any of a general purpose device such as a computer or a special purpose device such as a client, a server, etc. Any of these general or special purpose devices can include any suitable components such as a hardware processor (which can be a microprocessor, digital signal processor, a controller, etc.), memory, communication interfaces, display controllers, input devices, etc. For example, computing device 1110 can be implemented as a smartphone, a tablet computer, a wearable computer, a smart television, a set-top box, a digital media receiver, a game console, a personal computer, a laptop computer, a personal data assistant (PDA), a home entertainment system, any other suitable computing device, or any suitable combination thereof.

For example, in some implementations, a program can be presented using a first computing device 1110, such as a smart television, a set-top box, a digital media receiver, etc., and supplemental content can be presented using a second computing device 1110, such as a mobile device, a tablet computer, a smartphone, a wearable computer, a PDA, etc.

In some implementations, content source(s) 1114 can be any suitable content sources, such as a cable (or telephone) television content source, a satellite television content source, an on-demand program content source, an over-the-top program content source, an Internet content source, a streaming program content source, any other suitable content source, or any suitable combination thereof.

In some implementations, communications network 1106 can be any suitable computer network or combination of such networks including the Internet, an intranet, a wide-area network (WAN), a local-area network (LAN), a wireless network, a digital subscriber line (DSL) network, a frame relay network, an asynchronous transfer mode (ATM) network, a virtual private network (VPN), etc. Communications links 1104, 1108, and 1112 can be any communications links suitable for communicating data among computing devices 1110, server 1102, and/or content source(s) 714, such as network links, dial-up links, wireless links, hardwired links, any other suitable communications links, or any suitable combination of such links. Computing devices 1110 can enable use of the techniques described herein that can allow the features of the mechanisms to be used. Computing devices 1110, server 1102 and content source(s) 1114 can be located at any suitable location.

In some implementations, server 1102 can include one or more modules 1120-1130 and/or databases 1140-1142 that can be interconnected, for performing various functions of the application and/or facilitating the mechanisms for presenting supplemental content items based on media content information.

In some implementations, a front-end server module 1120 can perform processes for presenting supplemental content items as described above in connection with, for example, FIGS. 1-3. For example, the front-end server can act as a proxy between the client application executing on computing device 1110 and other server modules, such as capture module 1122, audio matching module 1124, and supplemental content module 1126.

In some implementations, a capture module 1122 can receive media data related to a program or a channel, such as video data, audio data, electronic program guide data, metadata, subtitles or captioning content, etc., as described above in connection with, for example, FIGS. 1 and 2. Additionally or alternatively, capture module 1122 can extract various media data from content provided from content sources as described in connection with, for example, FIGS. 1 and 2. Such extracted media data can include, for example, audio fingerprints, subtitles, etc. This information can be stored, for example, in a database (not shown) for use by the search application executing on front-end server 1120 in identifying channels, identifying program and/or other program-related information, obtaining supplemental content items, and/or various other operations.

In some implementations, guidance data 1140, such as an electronic program guide (EPG) database and a closed caption database, can be accessed. For example, front-end server module 1120 can access guidance data 1140 to obtain program information related to an identified channel or an identified program and use the program information to search for matching supplemental content items. It should be noted that, in some implementations, guidance data 1140 can be provided from, for example, content source(s) 1114.

In some implementations, an audio matching module 1124 can receive audio fingerprint data for a program from capture module 1122 and compare the received audio fingerprint data against stored audio fingerprint data in a fingerprint database 1142. This fingerprint database can be used, for example, to identify a channel as described above, to determine a program that is being presented to a user, etc.

In some implementations, a supplemental content module 1126 can find matching supplemental content items associated with a program using keyword extraction module 1130 and supplemental content matching module 1128. For example, keyword extraction module 1130 can extract keywords from captured audio data, video data, and/or subtitle information and obtain supplemental content items from multiple content sources (e.g., content sources 1114). In some implementations, keyword extraction module 1130 can then rank each of the supplemental content items by recency, popularity (e.g., popularity based on click-through-rate), etc. In response to ranking the supplemental content items, keyword extraction module 1130 can select at least one of the supplemental content items for presenting to the user at a particular position in the program.

It should be noted that, although modules 1120-1130 and databases 1140-1142 are shown as being included in server 1102, these modules and/or databases can be provided in different servers in various combinations. For example, supplemental content module 1126 can be provided on a first server and modules 1120-1124 can be provided on a second server. As another example, each module can be provided on a different server. It should be noted that these are merely examples, and the modules described can be organized in any suitable manner.

It should also be noted that modules 1120-1130 can be included as part of the application, can each be a separate application, or can be part of any other suitable application.

Figure 12:
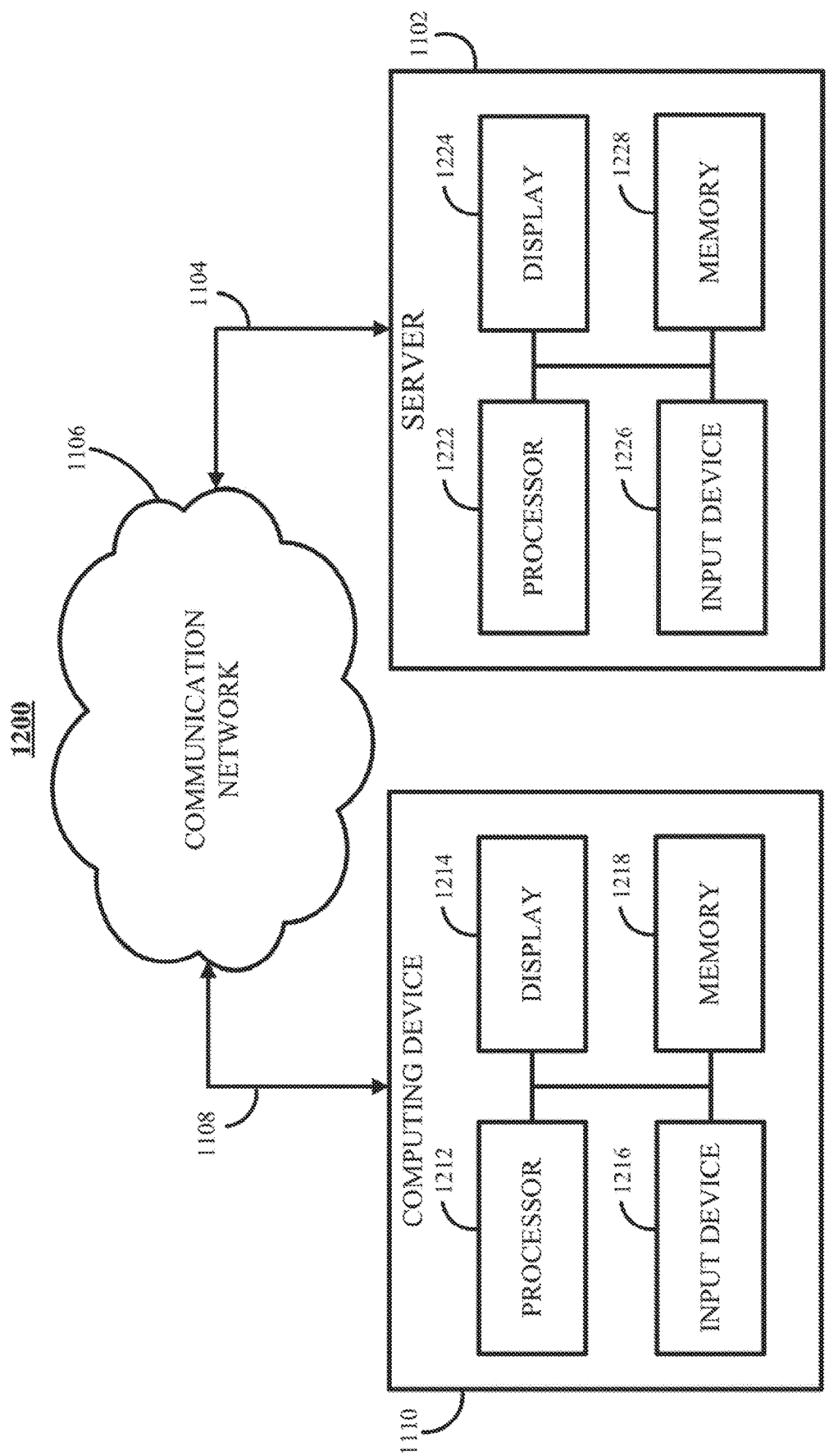
FIG. 12 shows a detailed example of a server and one of the computing devices of FIG. 11 that can be used in accordance with some implementations of the disclosed subject matter.

FIG. 12 illustrates an example 1200 of hardware that can be used to implement server 1102 and one of computing devices 1110 depicted in FIG. 11 in accordance with some implementations of the disclosed subject matter. Referring to FIG. 12, computing device 1110 can include a hardware processor 1212, a display 1214, an input device 1216, and memory 1218, which can be interconnected. In some implementations, memory 1218 can include a storage device (such as a non-transitive computer-readable medium) for storing a computer program for controlling hardware processor 1212.

Hardware processor 1212 can use the computer program to present on display 1214 content and/or an interface that allows a user to interact with the client application and to send and receive data through communications link 1108. It should also be noted that data received through communications link 1108 or any other communications links can be received from any suitable source. In some implementations, hardware processor 1212 can send and receive data through communications link 1108 or any other communication links using, for example, a transmitter, receiver, transmitter/receiver, transceiver, or any other suitable communication device. Input device 1216 can be a computer keyboard, a mouse, a trackball, a keypad, a remote control, any other suitable input device, or any suitable combination thereof. Additionally or alternatively, input device 1216 can include a touch screen display 1214 that can receive input (e.g. using a finger, a stylus, or the like).

Server 1102 can include a hardware processor 1222, a display 1224, an input device 1226, and memory 1228, which can be interconnected. In some implementations, memory 1228 can include a storage device for storing data received through communications link 1104 or through other links, and processor 1222 can receive commands and values transmitted by one or more users of, for example, computing device 1110. The storage device can further include a server program for controlling hardware processor 1222.

The mechanisms described herein for providing supplemental content items and other content based on media content can be implemented in computing devices 1110 and/or server 1102 as software, firmware, hardware, or any suitable combination thereof.

In some implementations, server 1102 can be implemented as one server or can be distributed as any suitable number of servers. For example, multiple servers 1102 can be implemented in various locations to increase reliability, function of the application, and/or the speed at which the server can communicate with computing devices 1110.

In some implementations, the client application can include an application program interface (not shown), and/or can be resident in memory 1218 of computing device 1110 and/or memory 1228 of server 1102. Additionally or alternatively, a graphical user interface ("GUI") can be distributed to computing device 1210, which can allow a user to interact with the client application resident at, for example, server 1102.

In some implementations, the application can include client-side software, server-side software, hardware, firmware, or any suitable combination thereof. For example, the application can encompass a computer program that causes one or more processors to execute the content generation application. As another example, the application(s) can encompass a computer program written in a programming language recognizable by computing device 510 and/or server 502 that is executing the application(s) (e.g., a program written in a programming language, such as, JAVA, C, Objective-C, C++, C#, JAVASCRIPT, Visual Basic, HTML, XML, ColdFusion, any other suitable approaches, or any suitable combination thereof).

In some implementations, the application can encompass one or more Web-pages or Web-page portions (e.g., via any suitable encoding, such as HyperText Markup Language ("HTML"), Dynamic HyperText Markup Language ("DHTML"), Extensible Markup Language ("XML"), JAVASERVER Pages ("JSP"), Active Server Pages ("ASP"), Cold Fusion, or any other suitable approaches).

In some implementations, any suitable computer readable media can be used for storing instructions for performing the functions and/or processes described herein. For example, in some implementations, computer readable media can be transitory or non-transitory. For example, non-transitory computer readable media can include media such as magnetic media (such as hard disks, floppy disks, or any other suitable magnetic media), optical media (such as compact discs, digital video discs, BLU-RAY discs, or any other suitable optical media), semiconductor media (such as flash memory, electrically programmable read-only memory (EPROM), electrically erasable programmable read-only memory (EEPROM), or any other suitable semiconductor media), any suitable media that is not fleeting or devoid of any semblance of permanence during transmission, and/or any suitable tangible media. As another example, transitory computer readable media can include signals on networks, in wires, conductors, optical fibers, circuits, any suitable media that is fleeting and devoid of any semblance of permanence during transmission, and/or any suitable intangible media.

It should be understood that the above described steps of the processes of FIGS. 1-3 can be executed or performed in any order or sequence not limited to the order and sequence shown and described in the figures. Also, some of the above steps of the processes of FIGS. 1-3 can be executed or performed substantially simultaneously where appropriate or in parallel to reduce latency and processing times.

It should also be noted that, as used herein, the term mechanism can encompass hardware, software, firmware, or any suitable combination thereof.

Accordingly, methods, systems, and media for presenting supplemental content relating to media content are provided.

Although the invention has been described and illustrated in the foregoing illustrative implementations, it is understood that the present disclosure has been made only by way of example, and that numerous changes in the details of the implementation of the invention can be made without departing from the spirit and scope of the invention, which is limited only by the claims that follow. Features of the disclosed implementations can be combined and rearranged in various ways.

What is claimed is:

1. A method for providing media guidance, the method comprising:
    causing, using a hardware processor, a plurality of recommendation card interfaces that each include one of a plurality of supplemental content items to be presented on a display associated with a mobile device, wherein each of the plurality of supplemental content items is stored on the mobile device as relating to a media content item being presented by a media device;
    receiving, using the hardware processor, state information associated with the mobile device that indicates a subsequent visit to the plurality of recommendation card interfaces;
    determining, using the hardware processor, that the state information comprises an indication that the mobile device returned from a display inhibited state in which presentation of the plurality of recommendation card interfaces was previously inhibited;
    identifying, using the hardware processor, the media content item being presented by the media device; and
    causing, using the hardware processor, the plurality of recommendation card interfaces to be updated with at least a second supplemental content item from the plurality of supplemental content items stored on the mobile device, wherein the second supplemental content item relates to the media content item that was identified as being presented by the media device.

2. The method of claim 1, further comprising:
obtaining the plurality of supplemental content items corresponding to the media content item.

3. The method of claim 1, further comprising causing the plurality of recommendation card interfaces to be presented in response to detecting the presence of the media device on a local area network, wherein the media device and the mobile device are connected to the local area network.

4. The method of claim 1, further comprising receiving an audio fingerprint of audio information corresponding to the media content item being presented on the media device, wherein the media content item is identified based on the audio fingerprint.

5. The method of claim 1, further comprising:
extracting an audio stream from a plurality of media content items;
generating, for each of the plurality of media content items, at least one audio fingerprint from at least a portion of the extracted audio stream that corresponds to one of the plurality of media content items;
storing the at least one audio fingerprint in a data source indexed by media content item;
comparing the audio fingerprint with the at least one stored audio fingerprint; and
identifying the media content item that is being presented on the media device based on the comparison.

6. The method of claim 1, further comprising:
storing the plurality of supplemental content items, media information, and a plurality of keywords in a data source indexed by media content item and time within the media content item;
selecting the first supplemental content item from the data source based on a first time determined from a request for supplemental content relating to the media content item being presented by the media device; and
selecting the second supplemental content item from the data source based on a second time determined from the state information.

7. The method of claim 1, wherein the second supplemental content item is caused to be presented in response to determining that the state information was received prior to the end of the media content item and in response to determining that the state information was received within a predetermined time from the presentation of the plurality of recommendation card interfaces.

8. A system for providing media guidance, the system comprising:
a hardware processor that is configured to:
cause a plurality of recommendation card interfaces that each include one of a plurality of supplemental content items to be presented on a display associated with a mobile device, wherein each of the plurality of supplemental content items is stored on the mobile device as relating to a media content item being presented by a media device;
receive state information associated with the mobile device that indicates a subsequent visit to the plurality of recommendation card interfaces;
determine that the state information comprises an indication that the mobile device returned from a display inhibited state in which presentation of the plurality of recommendation card interfaces was previously inhibited;
identify the media content item being presented by the media device; and
cause the plurality of recommendation card interfaces to be updated with at least a second supplemental content item from the plurality of supplemental content items stored on the mobile device, wherein the second supplemental content item relates to the media content item that was identified as being presented by the media device.

9. The system of claim 8, wherein the hardware processor is further configured to:
obtain the plurality of supplemental content items corresponding to the media content item.

10. The system of claim 8, wherein the hardware processor is further configured to cause the plurality of recommendation card interfaces to be presented in response to detecting the presence of the media device on a local area network, wherein the media device and the mobile device are connected to the local area network.

11. The system of claim 8, wherein the hardware processor is further configured to receive an audio fingerprint of audio information corresponding to the media content item being presented on the media device, wherein the media content item is identified based on the audio fingerprint.

12. The system of claim 8, wherein the hardware processor is further configured to:
extract an audio stream from a plurality of media content items;
generate, for each of the plurality of media content items, at least one audio fingerprint from at least a portion of the extracted audio stream that corresponds to one of the plurality of media content items;
store the at least one audio fingerprint in a data source indexed by media content item;
compare the audio fingerprint with the at least one stored audio fingerprint; and
identify the media content item that is being presented on the media device based on the comparison.

13. The system of claim 8, wherein the hardware processor is further configured to:
store the plurality of supplemental content items, media information, and a plurality of keywords in a data source indexed by media content item and time within the media content item;
select the first supplemental content item from the data source based on a first time determined from a request for supplemental content relating to the media content item being presented by the media device; and
select the second supplemental content item from the data source based on a second time determined from the state information.

14. The system of claim 8, wherein the second supplemental content item is caused to be presented in response to determining that the state information was received prior to the end of the media content item and in response to determining that the state information was received within a predetermined time from the presentation of the plurality of recommendation card interfaces.

15. A non-transitory computer-readable medium containing computer executable instructions that, when executed by a processor, cause the processor to perform a method for providing media guidance, the method comprising:
causing a plurality of recommendation card interfaces that each include one of a plurality of supplemental content items to be presented on a display associated with a mobile device, wherein each of the plurality of supplemental content items is stored on the mobile device as relating to a media content item being presented by a media device;

receiving state information associated with the mobile device that indicates a subsequent visit to the plurality of recommendation card interfaces;

determining that the state information comprises an indication that the mobile device returned from a display inhibited state in which presentation of the plurality of recommendation card interfaces was previously inhibited;

identifying the media content item being presented by the media device; and causing the plurality of recommendation card interfaces to be updated with at least a second supplemental content item from the plurality of supplemental content items stored on the mobile device, wherein the second supplemental content item relates to the media content item that was identified as being presented by the media device.

16. The non-transitory computer-readable medium of claim 15, wherein the method further comprises:
obtaining the plurality of supplemental content items corresponding to the media content item.

17. The non-transitory computer-readable medium of claim 15, wherein the method further comprises causing the plurality of recommendation card interfaces to be presented in response to detecting the presence of the media device on a local area network, wherein the media device and the mobile device are connected to the local area network.

18. The non-transitory computer-readable medium of claim 15, wherein the method further comprises receiving an audio fingerprint of audio information corresponding to the media content item being presented on the media device, wherein the media content item is identified based on the audio fingerprint.

19. The non-transitory computer-readable medium of claim 15, wherein the method further comprises:
extracting an audio stream from a plurality of media content items;
generating, for each of the plurality of media content items, at least one audio fingerprint from at least a portion of the extracted audio stream that corresponds to one of the plurality of media content items;
storing the at least one audio fingerprint in a data source indexed by media content item;
comparing the audio fingerprint with the at least one stored audio fingerprint; and
identifying the media content item that is being presented on the media device based on the comparison.

20. The non-transitory computer-readable medium of claim 15, wherein the method further comprises:
storing the plurality of supplemental content items, media information, and a plurality of keywords in a data source indexed by media content item and time within the media content item;
selecting the first supplemental content item from the data source based on a first time determined from a request for supplemental content relating to the media content item being presented by the media device; and
selecting the second supplemental content item from the data source based on a second time determined from the state information.

21. The non-transitory computer-readable medium of claim 15, wherein the second supplemental content item is caused to be presented in response to determining that the state information was received prior to the end of the media content item and in response to determining that the state information was received within a predetermined time from the presentation of the plurality of recommendation card interfaces.

* * * * *